(12) United States Patent
Araújo Carreira

(10) Patent No.: US 11,192,080 B2
(45) Date of Patent: Dec. 7, 2021

(54) PYROLYSIS PLANT

(71) Applicant: Germano Araújo Carreira, Fátima (PT)

(72) Inventor: Germano Araújo Carreira, Fátima (PT)

(*) Notice: Subject to any disclaimer, the term of this patent is extended or adjusted under 35 U.S.C. 154(b) by 0 days.

(21) Appl. No.: 17/277,956

(22) PCT Filed: Sep. 19, 2019

(86) PCT No.: PCT/EP2019/000274
§ 371 (c)(1),
(2) Date: Mar. 19, 2021

(87) PCT Pub. No.: WO2020/057774
PCT Pub. Date: Mar. 26, 2020

(65) Prior Publication Data
US 2021/0308644 A1    Oct. 7, 2021

(30) Foreign Application Priority Data
Sep. 20, 2018   (EP) .................................... 18398009

(51) Int. Cl.
| B01J 6/00 | (2006.01) |
| C09C 1/48 | (2006.01) |
| C10G 1/10 | (2006.01) |
| F23G 5/027 | (2006.01) |
| F23G 5/08 | (2006.01) |
| F23G 7/12 | (2006.01) |
| F23K 1/04 | (2006.01) |
| F23G 7/06 | (2006.01) |

(52) U.S. Cl.
CPC ............... *B01J 6/008* (2013.01); *C09C 1/482* (2013.01); *C10G 1/10* (2013.01); *F23G 5/027* (2013.01); *F23G 5/08* (2013.01); *F23G 7/066* (2013.01); *F23G 7/12* (2013.01); *F23K 1/04* (2013.01); *C10G 2300/1003* (2013.01); *F23G 2205/121* (2013.01); *F23G 2205/14* (2013.01); *F23G 2900/50213* (2013.01)

(58) Field of Classification Search
CPC .. B01J 6/008; C09C 1/482; F23G 5/08; F23G 5/027; F23G 7/12; F23G 7/066; F23G 2205/14; F23G 2900/50213; F23G 2205/121; F23K 1/04; C10G 1/10; C10G 2300/1003
See application file for complete search history.

(56) References Cited

U.S. PATENT DOCUMENTS

| 3,087,443 A * | 4/1963 | Attanasio ................ F23J 11/00 110/212 |
| 9,663,662 B1 | 5/2017 | Khusidman et al. |
| 2017/0361558 A1 | 12/2017 | Tenore et al. |
| 2017/0362511 A1 | 12/2017 | Tenore et al. |
| 2018/0010048 A1 | 1/2018 | Oluwaseun et al. |
| 2018/0010049 A1 | 1/2018 | Tenore et al. |

OTHER PUBLICATIONS

Decision to Grant a Patent dated Mar. 25, 2021 in corresponding European application No. 18398009.3; 2 pgs.
International Search Report dated Jan. 28, 2020 in corresponding application No. PCT/EP2019/000274; 3 pgs.

* cited by examiner

*Primary Examiner* — David J Laux
(74) *Attorney, Agent, or Firm* — Maier & Maier, PLLC

(57) ABSTRACT

A pyrolysis plant including: a) an exhaust heated feeder; b) a pyrolysis reactor; c) a rotary screen cleaning tower; d) an exhaust heat fuel cleaner; e) a carbon refiner; and f) a safety burner tower.

9 Claims, 17 Drawing Sheets

PYROLYSIS PLANT

FIELD OF THE INVENTION

The present invention concerns to a pyrolysis plant for processing tire crumb material for recovering for example fuels and char/ash/carbon.

BACKGROUND

Tire-to-fuel pyrolysis plants presently in use have a lot of problems mainly concerned with the following devices Pyrolysis plants are known from US 2018/010048 A1, US 2018/010049 A1, U.S. Pat. No. 9,663,662 B1, US 2017/361558 A1 and US 2017/362511 A1.

Feeder

Inherent problems with biomass feeder systems are many. The ability to maintain constant pressure on the screw feeder without overloading a motor is a standard problem. The use of a current transducer is used in some cases to read the motors amps and stop the motor for a few seconds and then restart. Another way is a timer on the motor to turn it on and off to prevent overloading, but this puts great ware on the motor. To compensate for some of these problems, over sizing the motors and gearboxes to withstand the back pressure and ware are used.

The internal process of a pyrolysis reactor can be either for negative pressure or invention for positive pressure environments, but this invention is for positive environments. In either case, a seal must be maintained to prevent oxygen from entering the system. Some systems use gates and valves to seal the feeder. It is commonly used the batch feeding of the inlet hopper and cycling the feed on and off to allow for gates to open and close to maintain the seal. This type of system allows oxygen in the hopper to enter in the pyrolysis reactor.

Another problem with a gated or valve invention is the failsafe issue. In a full power failure, the gates or valves must close completely to prevent oxygen leaks into the system.

Pyrolysis Reactor

The pyrolysis reactors used in pyrolysis plants are large rotating vessels or pipes with augers. The first problem with rotating vessels is their lack of ability to be filled and discharged continuously. These reactors use a batch filling concept to insert tire crumb material and then heat the material with the vessel having been sealed completely. They claim it to be continuous because they have multiple units. As one is being filled up another one is being emptied out, so the process is a continuous movement of material, but the reactor works in a batch process.

A problem with rotating vessels is the sealing mechanisms. They expand due to heat and leak oxygen into the vessels creating a fire hazard. The start-up time is, therefore, significantly prolonged, since it is required to allow the reactor to cool down prior re-starting the vessel and thereafter to evacuate all remaining oxygen before heating up the system again. Then again, the vessel must be cooled down before cleaning or opening any access door.

Another problem with the pyrolysis reactors of the prior art is char, ash, and carbon removal as it is more cumbersome and very dirty because of the nature of the open cleaning. The rotating vessel collects char/ash/carbon on the walls and must be removed before the next run. This is very time consuming and very expensive due to the low efficiency of heating, cooling and cleaning. Other reactors use tanks and hoppers that are very similar in nature. They must be opened and filled with tire crumb material and then sealed, heated, cooled, and then repeat the process of cleaning. These vessels require high machine surfaces access for a good seal.

Another problem with the reactors of the prior art is the batch heating and cooling because it requires large amounts of energy to achieve the pyrolysis process in a timely manner Manual labour is used in most of the cleaning process. This is expensive and can be hazards to the employees exposed to the airborne dust.

Another problem with the pyrolysis reactors of the prior art is the standard pipe that uses burner boxes along the length of the pipe to produce heat for the reaction. A typical reactor used a burner box around a section of pipe and allow for a small space between the burner boxes for outside supports.

Another problem with the pyrolysis reactors of the prior art is the expansion associated with them. If the vapour outlet or the feed system is not located on the same end, then the expansion will require special fittings to allow for movement of the inlet feeder or the outlet location.

Another problem with the pyrolysis reactors of the prior art is the need to abort the built-up gas (syngas) either from over process or standard shut down. This gas is typically just flared off, where the gas is piped to a flare stack and is ignited outside. The typical fuel flare uses a rich fuel mixture, where the fuel gas is exposed to just atmospheric air for ignition.

In the case of a stacked reactor, where one pipe drops into another pipe below, separated burner boxes are used to heat only the top and another to heat the lower section in the same zone or location in the stack up. Two separate boxes use twice the energy as one box covering both. The upper section will do about 90% of the needed work while the lower is only doing 10% of the remaining work and that amount reduces as it travels downstream from the feed point. So, the inlet section is above the lower outlet section. The inlet section uses most of the needed heat because the raw material absorbs that heat while the material (char/carbon) is in the lower burner box section and only needs heat to stop fuel from condensing in that area.

The ash and char already reaching high temperatures will not absorb that heat. So, each section (top and bottom) heat ratio absorption changes from 90% top to 10% bottom, at the cross over drop section (opposite end). But the material absorbing mass reduces as it travels down the reactor pipes due to the removal of any absorbed liquids.

In the pyrolysis reactors of the prior art the extraction of the fuel is very similar to the present invention as it is vaporized, and pulled out of the reactor, then condensed into a liquid form.

Cleaning Tower

Known prior art uses a vapour tower to discharge the biomass fuel from the pyrolysis reactor. Some known problems with this design are that it allows carbon particles to be carried through to the fuel collection tanks. Carbon particles will not collect vaporized fuel if the fuel is in a gaseous state. Standard cleaning tower discharge stacks do not prevent the airborne carbon from leaving the pyrolysis reactor. Other problems with discharge vapour tower is its fixed height. Biomass fuel vapours will drop in temperature as it leaves the reactor and condenses when its temperature is lower than its boiling point. Therefore, a fixed height of the standard discharge tower allows for only one temperature drop due to its length. Other problems involved build-up inside the tower if any heavy fuels condense on the side. The liquid captures any carbon and create a build-up, reducing cross area in the tower and increasing the velocity of the vaporized gas. This decrease in volume and increase in velocity will change the dynamics of the fuel type leaving the tower.

The reactors known in the prior art uses a vapour tower to discharge the tire crumb material fuel from the pyrolysis reactor, which suffer from some problems due to the invention used. This vapour tower allows carbon particles to be carried through to the fuel collection tanks. Carbon particles will not collect vaporized fuel if the fuel is in a gaseous state.

Standard cleaning tower discharge stacks do not prevent the airborne carbon from leaving the pyrolysis reactor.

The reactors known in the prior art uses standard screens for blocking materials, being normally plugged due to the consistent opening size of the screens. The static screens in this invention has tapered openings in two directions. Horizontally going from a smaller opening, the larger open helps the dislodging of the build-up of materials. The screen plates have tapered slots openings larger at the bottom than the top also helping to dislodge any build¬up of material. Typical screens also create back pressure due to the small openings and the pressure will increase if the openings become plugged.

Fuel Cleaner

A standard biomass pyrolysis reactor uses heat to turn the incoming biomass into fuel. The biomass is heated in the chamber without oxygen and vaporizes. The vapour then travels to condensers and tanks where it condenses into a liquid. The biggest problem with bio-fuel systems is the carbon contaminants it makes when it produces fuel. Therefore, it results in a dark black coloured fuel due to the carbon particulates mixed with the fuel. This carbon mixed with the fuel will also increase the viscosity. This contaminated fuel can be used in some process but will create a black smoke due to the carbon particulate being burned along with the fuel. Additionally, smoke ash and char will also build-up on the exhaust systems from these burners. A separate process typically removes this carbon from the fuel.

It can be filtered, centrifuged or distilled. A filter can capture a lot of the carbon particles but based on the quality of the filter media. A centrifuge can remove particles of carbon from the fuel also, but both the filter and the centrifuge leave carbon molecules in the fuel creating a dark coloured fuel and causing a darker smoke when burned. Both the filter and centrifuge system require another pump and transport piping and tanks to achieve the removal of carbon. A distillation system will indeed remove the carbon from the fuel along with the fractioned different types of fuel derived from the pyrolysis process. But a distillation system is another process altogether from the pyrolysis process. In most cases, the fuel would need to be transported to another site for distillation, increasing the overall costs of the fuel. Typical pyrolysis systems, that use burners as the heat source, discharge the burner exhaust.

Safety Burner

A standard pyrolysis system will turn biomass into fuel, however syngas is a by-product. This gas can vary from C4 and lower with a mix of other gases. When any fuel is thermally cracked it will break long Carbon-chains into smaller Carbon-chains, so if there is some break of under 4 carbon chains this gas will not condense under atmosphere temperatures. A lot of bio-fuel process plants will use this gas for heat or even use a catalyst to reform the chains to make a liquid fuel. But even if it's used for heat for the pyrolysis process, it has to be managed.

A pyrolysis reactor needs heat to start the process and then maintain that heat for a prolong period of time for a batch system and continuously for a continuous reactor system. In both cases, when the process is going to shut down, the reactor will continue making syngas until it cools to a temperature that will not crack the bio-mass fuel being used.

So this gas must be vented from the reactors. A holding tank can be used but with limited pressure. The present of loose hydrogen will create a problem if a tank has both oxygen and hydrogen mixed together under pressure. By the very nature of most biomass materials, oxygen and hydrogen molecules can be present. In most application an open vented flare is used. A standard flare ignites using atmosphere air and burn very rich cheating black smoke.

SUMMARY

The object of the present invention is to overcome or at least efficiently reduce the problems of the prior art through a simple and rational solution. According to the present invention it is provided a new pyrolysis plant that solves or minimizes the prior art problems.

The pyrolysis plant according to invention is comprising an exhaust heated feeder, a pyrolysis reactor, a rotary screen cleaning tower, an exhaust heat fuel cleaner, a safety burner, a carbon refiner and the support devices and all fixtures as piping and valves needed to run the plant.

Exhaust Heated Feeder

Tire crumb material can be pneumatically or mechanically conveyed into a hopper feeder. Pneumatic conveying can take advantage of an air separation of the incoming material. The air separation will lift the tire crumb material but allows heavier objects like rocks or metal to fall out of the pickup opening.

Once the tire crumb material is moved into the receiver hopper and then drops into the inlet section of a heavy screw, the crumb material is pushed downwards, compressing the crumb and making a seal. This is done using a pneumatic or hydraulic drive to prevent over load if using an electric motor. A photo eye sensor or paddle switch indicates the height of the tire crumb material, it being known that blinding the opening or tripping the level switch will stop the air from conveying material to the hopper or the twin screw feeder from over filling the same. The ram screw will push the material into the twin screw feeder and helps make a seal to prevent the reactor gas from leaking. For any reason, if the material is not loaded into the feed hopper, a slide gate below the feed hopper can close in order to maintain the reactor sealed. This gate is also used to stop the input of material into the twin screw feeder and allows the twin feed screw feeder to clear itself of all material, if desired. The hopper drive can also be reversed to remove material out of the way of the slide gate, if needed.

This material is then pushed by the twin screw feeder to the upper reactor screw. This twin screw feeder is heated next to the drop zone by the same burner that provides heat to the reactor inlet.

The plug pressure from the feed hopper according to the present invention will eliminate the above problems. A vertical screw is placed inside the center of the feed hopper and rotates to push the tire crumb material downwards to make a compressed seal. Pressure must be maintained at all times to create the seal. The screw conveyor removes below the material from the hopper seal continuously so a balanced pressure is maintained.

The use of an air motor or hydraulic powered motors eliminates the above mentioned problems. The use of a pneumatic or hydraulic motor on the feed hopper vertical screw can supply continuous torque when the tire crumb material is removed by the feed screw below. This vertical screw runs a higher RPM than the feed screw below and is able to maintain pressure to create the seal.

Pneumatic or hydraulic powered motors also give direct back pressure readings and can be adjusted. Torque can be maintained with the reduction of RPM, where electric motors drop in some torque with the lower RPM.

In the event of a power failure the vertical hopper screw on the reactor feed screw below will stop. To prevent the pressure from turning the screw drives backwards in loosening the seal a worm gear type gearbox is used. A worm gear reducer will not allow the gears to be pushed backward unless power is applied from the motor both in forward or reverse direction. So if the material (being spring like) will not push the gear box and allow the seal pressure to relive the seal for example in the event of a power outage. The slide gate is actuated by a spring to close and stays open when power is applied. In the event of a power outage, the gate will try to close. If the material has heat on it, it will soften and allow the gate to push it until it closes. A worm gear prevents this when torque is reversed. And the slide gate below the hopper will close on default.

Heating the reactor feed screw is normally done three ways, electric heat, gas, or oil burners or through material compression inside the screw. Electric heat and the use of a separate burner requires extra resources while compression heat requires over sizing the feed drive and motor to deal with the needed pressure to create the heat. This invention removes those issues. Uses the same hot air that the burner box produces, removing the need for an extra outside source for heat. The pipe is arranged in front of the burner and is piped to a heated collar wrapping around the reactor feed screw.

A valve installed in the duct that runs to the heated collar controls the temperature to the reactor feeder. Back pressure to the exhaust burner is eliminated by venting the heated collar around the reactor feeder to the outside of the burner box, allowing for the hot air to follow a path out to the burner box.

Biomass materials, wood, plastic, mixed waste materials will compress and maintain a large percentage of the compressed shape. The tire crumb rubber will not. Crumb rubber has a very high drag coefficient C and elasticity value that tends it to spring back into its original shape and fight any incoming compression pressure. This creates problems with feed system in that the pitch of the twin screw feeder must maintain the same or greater volume as it travels down the twin screw feeder to eliminate any build-up of material pressure. Rubber is heated over 176.5° C. (350° F.) and it loses its elasticity and begins to bond together. It becomes very sticky and will begin to stick to the screw conveyor flights. The use of a twin screw eliminates this problem.

The volume is adjusted by the flights before the material is forced to come in contact with the feeder heater wall where it expands by increasing the pitch length to match the volume of the incoming pitch length. A twin screw is used to provide self-cleaning. One screw is left-hand flights while the other is right hand flights that are interlaced between each other so one flight wipes the inside of the opposite hand flights.

Other pyrolysis twin screw feeders place the twin screw feeder on the same centerline not allowing for a tail bearing on the screw shafts. When this type of feeders try to incorporate a bearing, it has to be of special alloy to withstand the environment inside the pyrolysis reactor.

By feeding the pyrolysis reactor over the top of the main reactor tube, the twin screw feeder is allowed to pass through an inlet pipe on top of the pyrolysis reactor and installed seals and bushing bearings on the outside where reduced heat eliminates the use for special alloys. The tail shafts require packing seals and bushing bearings. This arrangement combines them together. The packing seal is compressed with the bearing bushing and eliminates the use of an outside bearing support and can be serviced from the outside if needed.

If the vapour outlet or the inlet feeder is not located on the same end, then the reactor tube expansion will require special fittings to allow for movement of the inlet feeder or the outlet location. This design combines both in one area. This area is fixed to the steel frame and is not allowed to move when heat is applied to the pyrolysis reactor main tube. It expands away from this fixed point, allowing the feed system and exhaust system of the pyrolysis reactor to be stationary. The advantage of having the outlet port directly above the inlet is the ability to capture the lighter fuels as they leave the feed screw.

The longer the fuel stays into the heated zone of the pyrolysis the more it can break down into a lighter fuel or even gas. So, by removing the fuel that is created by the twin screw feeder, it will eliminate the light fuel from being returned to the pyrolysis reactor and re-cracked into shorted Carbon-chains.

This feeder has a reversing flight section, at the end, on the same solid auger section, allowing material to be reversed when it comes into contact with those flights. At this point the material will push together and have no place to go but down into the reactor tube. This keeps this twin screw feeder clean from end to end.

As the exhaust heats the area, the twin screw feeder is heated, the tire crumb material liquefies and fills the auger housing, creating an airlock by filling any space in between the tire crumb material. A continuous flow of input tire crumb material maintains the airlock seal. Due to the melted tire crumb material and to the solid tire crumb material, being under torque pressure, it is caused a seal in the feeder and it is stopped the introduction of air into the pyrolysis reactor and does not allow any gases out. The heated zone starts to liquefy and vaporizes the material only in the heated zone inside the burner box. A reverse flight section on the twin screw shaft shears the material off and prevents build-up on the shaft.

Pyrolysis Reactor

This pyrolysis reactor overcomes some of the prior art problems due to its continuous use and higher efficiency of heat exchange. Continuous flow of tire crumb material will enter into the pyrolysis reactor with a continuous flow and collected fuel, char/ash/carbon being discharged. The heat is applied from burners and is maintained on the pyrolysis reactor during the entire run without stopping to refill or stopping to discharge the char. The in-feed uses a material based compression seal and the discharge uses a series of gates to create an airlock seal. This invention can use both shredded tire crumb material, large tire crumb material or small tire crumb material.

The tire crumb material coming from the feeder enters the reactor inlet and drops into the pyrolysis reactor. The tire crumb material and vapours enter into the pyrolysis reactor and is pulled along the upper and lower reactor with double flight screws that have cut and fold slots. Because of the rapid movement of material inside the twin screw feeder, some tire crumb material is not vaporized. The un-vaporized tire crumb material is dropped down into the reactor tube to a double flight cut and fold ribbon reactor screw below. The pyrolysis reactor has burner boxes that transfers heat through the side wall of the reactor pipe to vaporize the material inside the reactor tube as it is being conveyed.

The tire crumb material along with any vapours will drop from the upper reactor to the lower reactor and continue being conveyed to the end of the lower reactor. About 90% of all the incoming tire crumb material will be vaporized in the upper reactor screw while the remaining 10% will be vaporized in the lower reactor. There is an opening at the opposite end in the lower reactor where any char/ash/carbon will fall into a conveyor that will remove it from the reactor through a gated hopper airlock system. At this point, the char/ash/carbon will be processed by the carbon refining processor.

This design makes the combination of enclosing the stacked reactor tubes with one burner box using only one burner per box. The upper reactor screw will expand when heated and travel away from the feed end. At the same time, the lower reactor tube expands in the opposite direction, being fixed by the cross over section. The upper section pulls the lower section because of this crossover connection. So, if the upper and lower reactor tubes are heated the same temperature, they will expand the same amount. Being in one heater box, this will occur.

The burner box is insulated on the inside and reduces the heat that the outer skin will see. In turn, the burner box does not expand to match the reactor tubes, so a sealed slip collar is used to support the burner box to the reactor tubes.

A gap exist between each burner box where a roller support cart can be attached to the reactor tubes. These roller support carts are bolted to the reactor tubes with an expandable clip. The base of the roller support carts uses a cam follower placed around a fixed flat bar landing to prevent movement in the X and Z axis while keeping the reactor tube from warping.

A burner with dual inlets is used to heat the pyrolysis reactor. One gas will be for start-up and the other inlet to the burner is for syngas. A separate control box is used for each burner but monitored by the main PLC. Temperature probes are used to control the reactor's temperature to a PID set point in the control box.

The heat from the boxes surrounding the reactor tube creates a high temperature that start the reaction. The tubes of the pyrolysis reactor will expand due to heat and travel in one direction because of being anchored by the heated feeder. The movement of the pyrolysis reactor is a lateral direction. The tube steel frame has flat bar landings for the roller support carts to travel on. The roller support carts have a cam follower roller to hold the pyrolysis reactor from moving up or to the sides, allowing the movement only in the long direction of reactor tubes. The upper reactor is tied to the lower reactor, being fixed by the connecting collar between the upper and lower reactor and pulls the lower reactor along as it expands. The lower reactor expands in the opposite direction as it is being heated. Being the same temperature, the upper and lower reactor tube expand at the same rate to keep the inlet burner box in place. The drives located at the ends of the reactor tubes are also on roller support carts to allow for expansion. The char/ash/carbon conveyor is on roller support to be pulled along with the pyrolysis reactor as it expands in the event of a mishap. The enormous advantage of the two-stack reactor is the combined length of expansion would be over if stacked end to end. By stacking the reactor tubes one over the other, the expansion is reduced by half the collected length. This also reduces the load on the screw augers inside the pyrolysis reactor by reducing the length.

The vapours are vented from the pyrolysis reactor and up through a rotary screen cleaning tower.

Rotary Screen Cleaning Tower

A veritable speed rotary screen can increase the travel distance of the vaporized gas by increasing the RPM of the turning paddles. The rotating paddles create a coil effect making the travel length greater.

A negative side wall design helps the self-cleaning and helps to drain the materials that may build on the wall. A negative side wall allows for a bigger diameter of the tower material to run down the side housing, while increasing the surface area, preventing compression of the draining material. That, along with the gravity effect, helps to self-clean the tower housing. The increase and decrease of the RPM on the turning paddles will change the amount of open time on the static screen.

According to the invention, the rotary screen has a fixed mounted fan wheel on the rotating shaft that the turning paddles are mounted to. The slower the rotary screen turns the less back pressure to the reactor system below. The faster it turns it reduces the screen opening size increase back pressure, but the fan wheel mounted at the top of the shaft compensates for that back pressure by pulling vapours up and out of the tower. The tower length is mechanically fixed but the vapour trail through the screen can vary by changing the RPM and creating a tighter coil path for the vapours.

Exhaust Heat Fuel Cleaner

This design uses the exhaust heat to clean the bio fuel on a continuous basis without the need of any additional cleaning steps as in the prior art.

The vapours vented from the pyrolysis reactor travel to the exhaust heated fuel cleaner where any carbon particles are removed. The vapours that condenses below 260° C. (500° F.) will condense and then re-boil into vapours leaving the heavier fuel behind. This heavy fuel, along with the carbon particles, will be drained back to the pyrolysis reactor for thermal cracking and to deposit the carbon back in the pyrolysis reactor.

The re-boiled and vaporized fuel then travels into a condenser for cooling. The first condenser is attached on top of a holding tank where Carbon-chain that boil above 149° C. (300° F.) is collected. The remaining vapours then travel up and out, then back down through a chilled condenser on top of a finish tank. The finish tank also has a chilling coil supplied by a glycol chiller that will condense the remaining Carbon-chains from C5 and above. This tank is set to around −6.7° C. (20° F.). The remaining vapours are now only non-condensable gas called synthesis gas or syngas. The syngas then passes through a set of bubblers to scrub the sulphur and other absorbable chemicals out of the gas stream. The cleaned syngas is then used to power the burners, the carbon refining and can also be used to power a generator.

The vaporized tire crumb material is condensed into a liquid fuel by use of standard heat exchanger shell and tube condensers. The finish tank is required to drop the vapours to around −6.7° C. (20° F.) to condense all Carbon-chains above C-4 into a liquid. To ensure that all the vapours are condensed, the finish tank has a set of coiled path tubes in a chilled glycol bath inside. The glycol will not freeze and is used in the industry for chilling. A compressor type chiller system is used for all the condenser cooling.

Carbon Refiner

The carbon char is discharged from the pyrolysis via a screw auger and through a gated airlock arrangement. The upper gate remains opened as the ash discharge auger is running. The char fills the first lower hopper and trips an ash discharge auger.

This will stop the ash discharge auger by killing power to the drive and close the top gate. The middle gate will open and deposit the char to another lower hopper and reclose the middle gate. The upper gate will open and start the char auger process again. The lower gate will now open and feed the metering screw below that rotates in a housing and has matching air openings. The metering screw has a hollow drive shaft to allow air movement through it.

The metering screw turns and forces char into the air stream (via duct) created by the burner blower. This burner blower supplies air for combustion of the supplied gas (liquid propane or syngas made by the pyrolysis process).

Carbon char along with the air entrances into the combustion chamber where it is ignited by a spark plug or pilot flame. The force from the blower mixes the char with the air and when it comes into contact with the flame and drives off any hydrocarbons will incinerate them along with any combustible material in the stream. A metering screw inside the chamber will pull the carbon to a discharge opening at the other end.

The slow revolution of the metering screw prolong the exposure time of the char material to the flame and can be adjusted as needed by the use of a motor drive invertor. An inverter or VDF allows for speed change, both manually or with the PLC. All drives are supported and seal with a packing seal. The burner blower needs a path for pressure relief or the back pressure will stop the air flow and extinguish the flame, so a vent line is attached to the opposite end of the chamber.

The vent line runs thought a water bubbler and is pulled with a vacuum source to balance the back pressure of the burner blower. The water in the vent bubbler also removes any airborne particles and will absorb chemicals like sulphur. The heaver char is now refined carbon and is conveyed to the discharge opening where it drops into a separator tank.

Water level is controlled by a typical level switch in the separator tank that allows the carbon to sink and the ash or remaining char to float. The carbon that sinks is collected at the bottom of a separator tank.

A vertical lift auger is used to pull the carbon out of the separator tank through an opening at the bottom and drains the water from the carbon through openings in the lift tube. The carbon is then deposited into a horizontal screw auger that passes through the burner box where heat is applied to the auger wall.

This heat drives off the water and returns it to the separator tank through a condenser inline. The condenser cools the water vapour back into a water state. The dry carbon in the auger then passes through an airlock and to containers.

The ash and char that floats inside the separator tank is vacuum off the top and pulled into a cyclone for collection. An airlock is also used at the discharge of the cyclone for removal.

The vacuum used to pull the char and ash is from a blower mounted on the top of the cyclone. The blower then pushes its exhaust into a bag filter where any dust collected can be collected and discharged via an airlock.

Safety Burner

Shut down of the system requires that the burners to the pyrolysis reactors to be shut off while the fans continue to run. The input of air only greatly reduces the cooling time. But the process is still producing syngas until the reactor temperature is below 204° C. (400° F.). The syngas must be either stored or consumed to allow the pyrolysis reactor to be vented of this gas. A high volume, low pressure tank would be required or the gas can be burned off.

A safety shut down burner will combust all the vented syngas by using a standard modulating burner piped into a vented burn chamber. An air forced burner is used to maintain the fuel to air ratio, so a complete combustion of the vented syngas can be accomplished, when the syngas volume drops due to the cooling of the pyrolysis reactor, the burner matches the gas volume so the air to gas ratio is efficient.

Support Equipment

The total process is monitored and controlled by a PLC program located in a main control panel. This is a standard in the industry. The burners are required to have independent controls to meet the required standards.

The pyrolysis reaction need heat to make the syngas that supplies the burners, but unless the syngas is stored, a start-up gas is needed. Liquid propane is very close to the same properties of the syngas, so it is the first choice to use purchased bottled LP gas for start-up. Other gases can be used but the supporting valves and regulators need to match the fuel being used for start-up.

Air compressor powers all the pneumatic valves, cylinders and gates while a hydraulic power system powers the feed hopper and twin screw drives.

The whole plant reactor process is protected with a nitrogen purge system. In the event of an emergency, the nitrogen gas will be piped into the pyrolysis reactor. This is an inert gas that will displace oxygen and prevent any incoming oxygen from entering the hot reactor by pressurizing the void inside the pyrolysis reactor. This gas can be used as a fire suppression system. The control valves can be configured to open under power failure if needed. The nitrogen ports to the pyrolysis reactor are placed in locations where the heat and vapour are the most concentrated.

BRIEF DESCRIPTION OF THE DRAWINGS

The preferred characteristics of the present invention will become apparent from the following description of some forms of preferred embodiment, given as an example with reference to the attached drawings, which are not necessarily drawn to scale, wherein.

DETAILED DESCRIPTION

The pyrolysis plant according to invention is comprising an exhaust heated feeder, a pyrolysis reactor, a rotary screen cleaning tower, an exhaust heat fuel cleaner, a carbon refiner, a safety burner and the support devices and all fixtures as piping and valves needed to run the plant as shown in the above said figures.

Exhaust Heated Feeder (FIGS. 1, 2, 3, 4 and 5)

Figure 1:
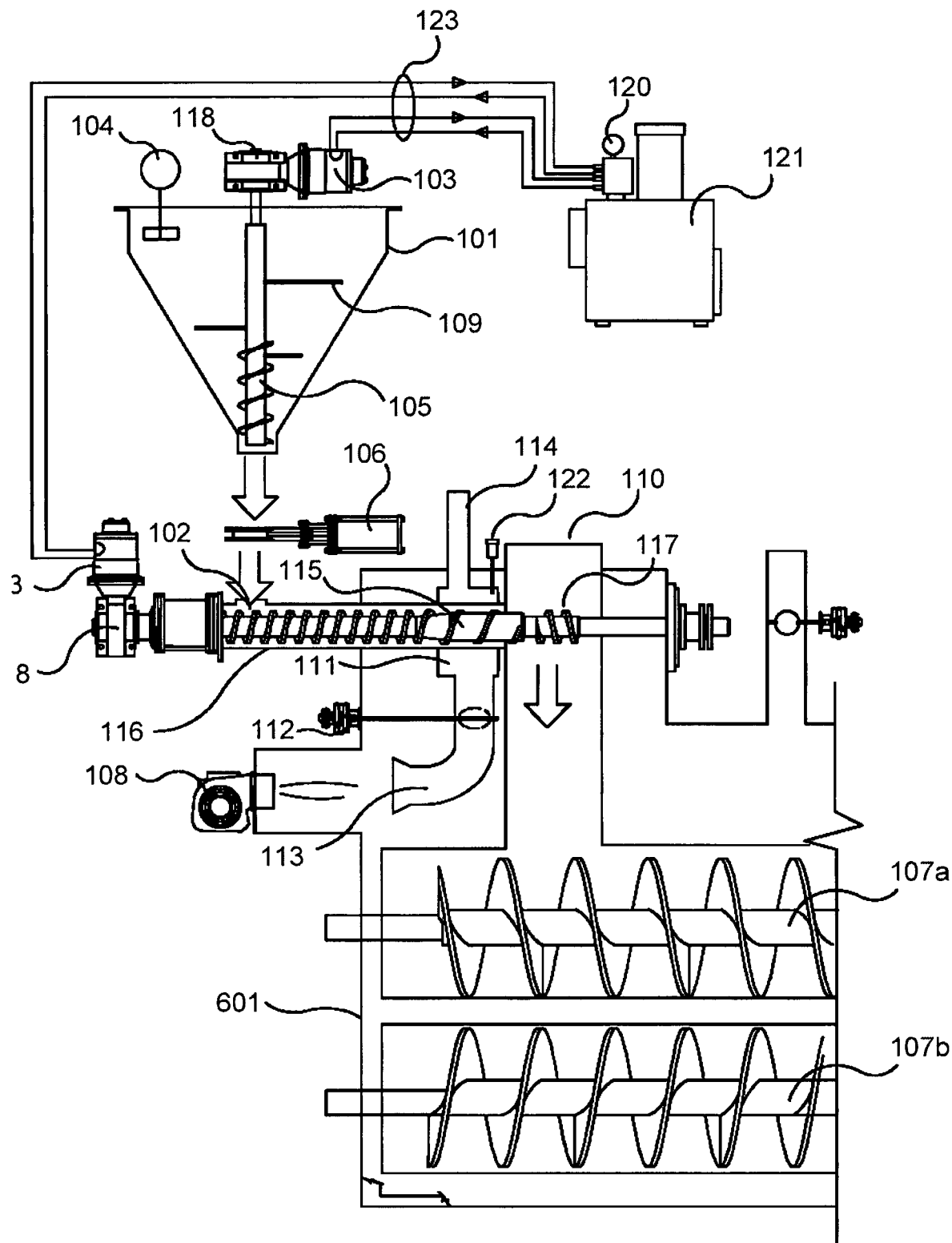
FIG. 1 is a simplified depiction of an exhaust heated system feeder schematic flow.
Figure 2:
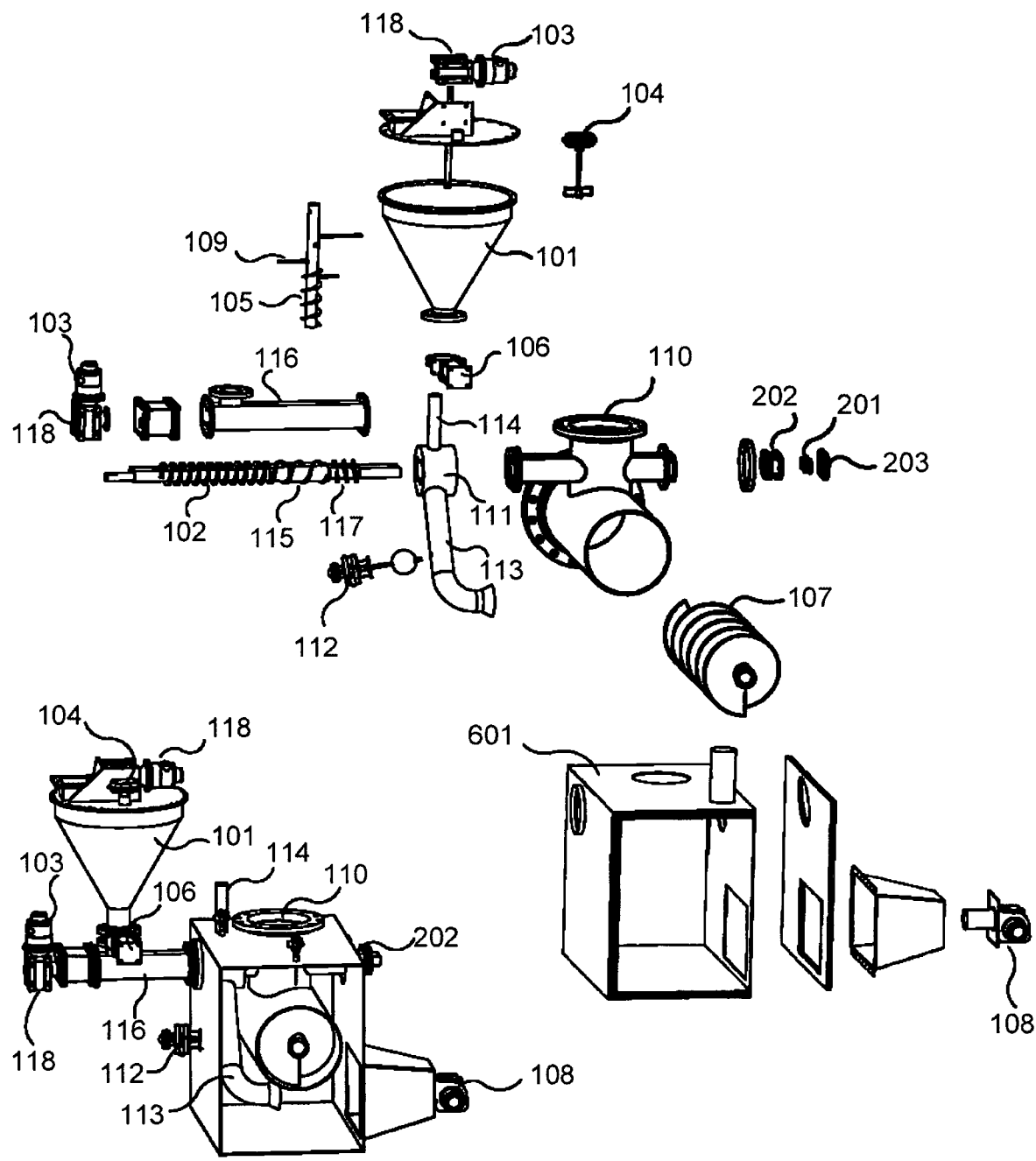
FIG. 2 is the component isometric view of the items making up the exhaust heated feeder.

Tire crumb material can be pneumatically or mechanically 503 conveyed into a hopper feeder system FIG. 1. Pneumatic conveying can take advantage of an air separation of the incoming material. The air separation will lift the tire crumb material but allows heavier objects like rocks or metal to fall out of the pickup opening. Once the tire crumb material is moved into the receiver hopper 101 and then drops into the inlet section of a vertical feed hopper screw 105, the crumb is pushed downwards, compressing the crumb and making a seal. This is done using a pneumatic or hydraulic drive 103 powered by a hydraulic power system 121 to prevent over load if using an electric motor.

A photo eye sensor or paddle switch 104 indicates the height of the tire crumb material, it being known that blinding the opening or tripping the level switch will stop the air from conveying material to the hopper or the screw feeder 503 from over filling the same. The ram screw 105 will push the material into the extruder inlet 102 and help make a seal to prevent the reactor gas from leaking. For any reason, if the material is not loaded into the hopper, a slide gate 106 below the hopper can close to maintain the pyrolysis reactor sealed. This gate is also used to stop the input of material into the twin screw feeder 102 and allows the twin screw feeder to clear itself of all material, if desired.

This material is then pushed by the twin screw feeder 102 to the reactor's upper reactor screw 107a. This twin screw feeder 102 is heated next to the drop zone by the same burner 108 that provides heat to the upper reactor screw 107a and the lower reactor screw 107b.

As the exhaust heats the area, the twin screw feeder is heated, the tire crumb material liquefies and fill the auger housing, creating an airlock by filling any space in the tire crumb material. A continuous flow of input tire crumb material maintains the airlock seal. Due to the melted tire crumb material and to the solid tire crumb material, being under torque pressure, it is caused a seal in the feeder and stops the introduction of air into the reactor and does not allow any gases out.

The heated zone starts to liquefy and vaporize the material only in the heated zone inside the burner box 601. This material enters the reactor inlet and drops into the upper reactor screw 107a. A reverse flight section on the twin screw shaft shears the material off and prevent build-up on the shaft. Because of the rapid movement of material inside the twin screw feeder, some tire crumb materials are not vaporized. The un-vaporized tire crumb material is dropped down into the reactor tube to a double flight cut and fold ribbon screw auger below.

The exhaust heated feeder shown in FIG. 1 makes it very adequate for feeding the pyrolysis reactor. Tire crumb material is placed in a feed hopper 101 where it is pushed down to the twin screw feeder 102 with the vertical screw section 105. The vertical feed hopper screw 105 also has bridge breaker arms 109 to keep the tire crumb material from binding inside the vertical feed hopper 101.

A slide gate 106 is located between the twin screw feeder 102 and the feed hopper 101 to allow for close off in the event of an emergency or during shutdown procedures. Vertical hopper screw 105 will reverse direction and lift the tire crumb material while the twin screw feeder 102 below evacuates the material into the pyrolysis reactor. This reversing action of the vertical feed hopper screw 105 pulls material up into the hopper allowing for a gap between the hopper 101 in the twin screw feeder 102 so a slide gate 106 close properly.

The twin screw feeder 102 will continue to run to remove all the material so it will not cool and harden inside the twin screw feeder 102. Allowed to remain inside, the material would lock the twin screws together and be very difficult to restart after cooling.

The tire crumb material travels down the twin screw feeder 102 to feed the reactor inlet 110. The tire crumb material goes through the twin screw feeder 102 that has left-hand flights on one side and right-hand flights on the other side that interlock and self-clean while pushing material into the reactor inlet 110.

The material in the twin screw feeder 102 pushes the material into a heated collar 111 inside the burner box. The heated collar 111 is provided with heat from the burner 108 on the burner box. A valve 112 is used to set the temperature of the heated collar 111 when it passes through to the reactor inlet. Hot air from the burner 108 travels through the duct 113 to the heated collar 111 and then around the twin screw feeding housing 116 and is vented from the exhaust duct 114.

The tire crumb material inside the twin screw feeder 102 travels down the flights till it comes into contact with an enlarged center section of the enlarged section 115 that pushes the material to the twin screw feeding housing 116 for rapid heating. Tire crumb material is pushed by the twin screw feeder 102 into the reactor inlet 110 where it comes into contact with a reversing flight section of the reversing flight section_117 and at this point the material is forced back to the incoming flight and creates a shearing motion were the material falls into the reactor inlet 110.

Either the feed hopper 101 and this twin screw feeder 102 are powered by a pneumatic or hydraulic drive 103 that adjusts the torque as needed. These pneumatic or hydraulic drives 103 are mounted to a gear speed reducer 118 to prevent back lash in the event of a power failure. The system is controlled by level indicators 104, temperature probes 122 and pressure sensors 120.

Figure 3:
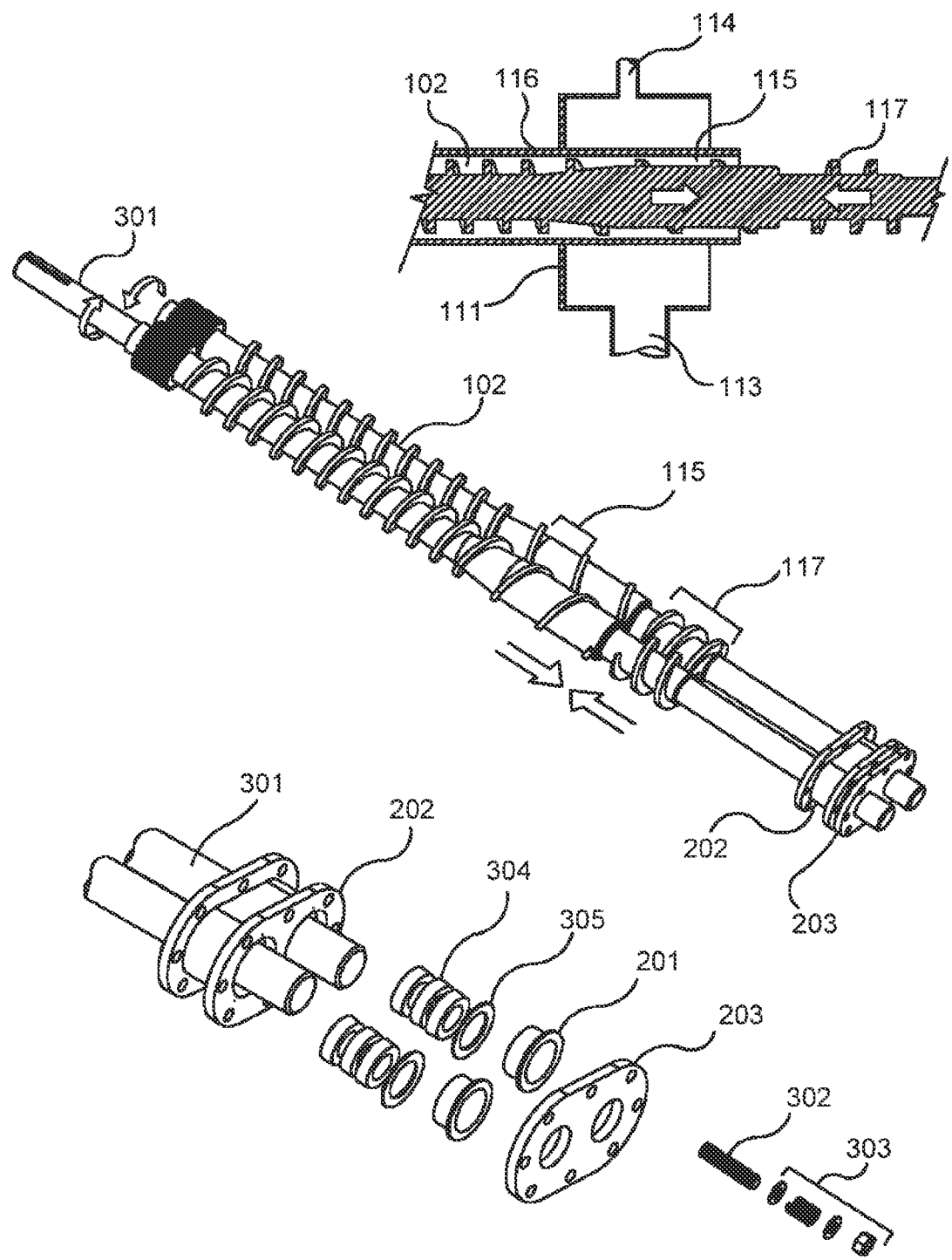
FIG. 3 is the isometric view of the exhaust heated twin screw feeders, heated collar and tail bearing with seal and a cross section of the twin screw feeder.

As can be seen in FIG. 3, the twin screw feeder 102 is composed of a left-hand flight and a right-hand flight where the volume between the twin screw feeder 102 matches the expanded enlarged section 115. This is done by increasing the flight pitch space. This prevents compression of the tire crumb material and prevent adding back pressure to the drive and from compressing the material together. The enlarged section 115 also pushes the material closer to the twin screw feeding housing 116.

This allows for faster heat transfer to the material and helps to prevent cold stops in the material. The main shafts 301 changes diameter to achieve this. The material is pushed forward to the reactor inlet 110 where it comes into contact with a reversed flight on the shaft reversing flight section 117. This reversing flight section 117 shears the material back and causes it to be sheared off and fall into the pyrolysis reactor below. The heated collar 111 is welded to the twin screw housing 116 for a one-sided seal.

The twin screw shaft passes through the reactor inlet 110 and is held by a set of bushing bearings on the outside. A packing seal is used to prevent leakage of the pressurized vapour gas. The bushings 201 fit inside a housing 202 to be pushed by the face plate 203 with the hardware 302/303 to create pressure on the packing seal material 304. A brass washer 305 is used to prevent the bushing from turning the packing seal material 304.

Pyrolysis Reactor (FIGS. 1, 4, 5, 6, 10 and 13)

Figure 10:
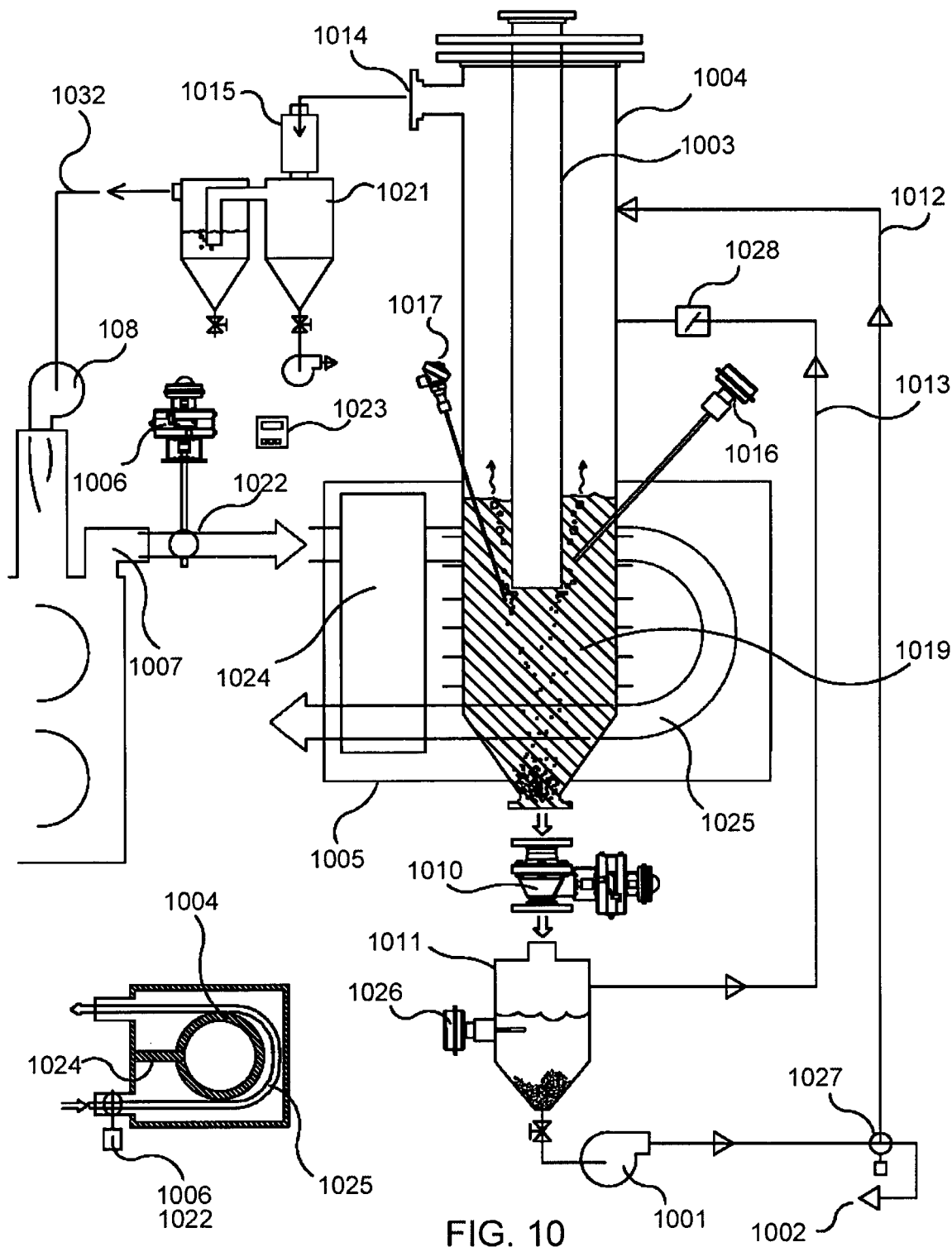
FIG. 10 is a simplified depiction of a conventional pyrolytic conversion system exhaust heated fuel cleaner schematic flow.
Figure 13:
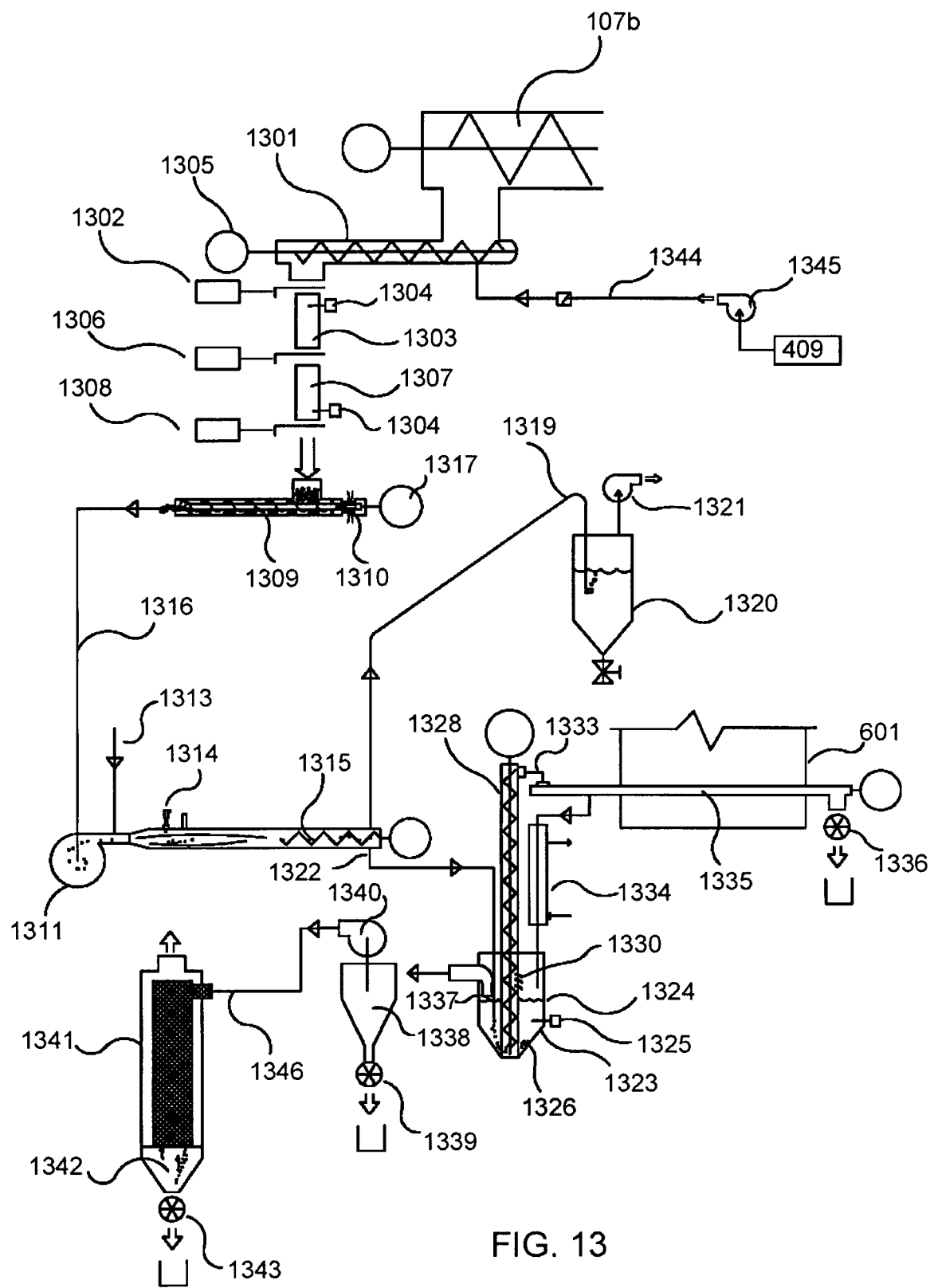
FIG. 13 is a simplified depiction of the carbon refiner schematic flow.
Figure 14:
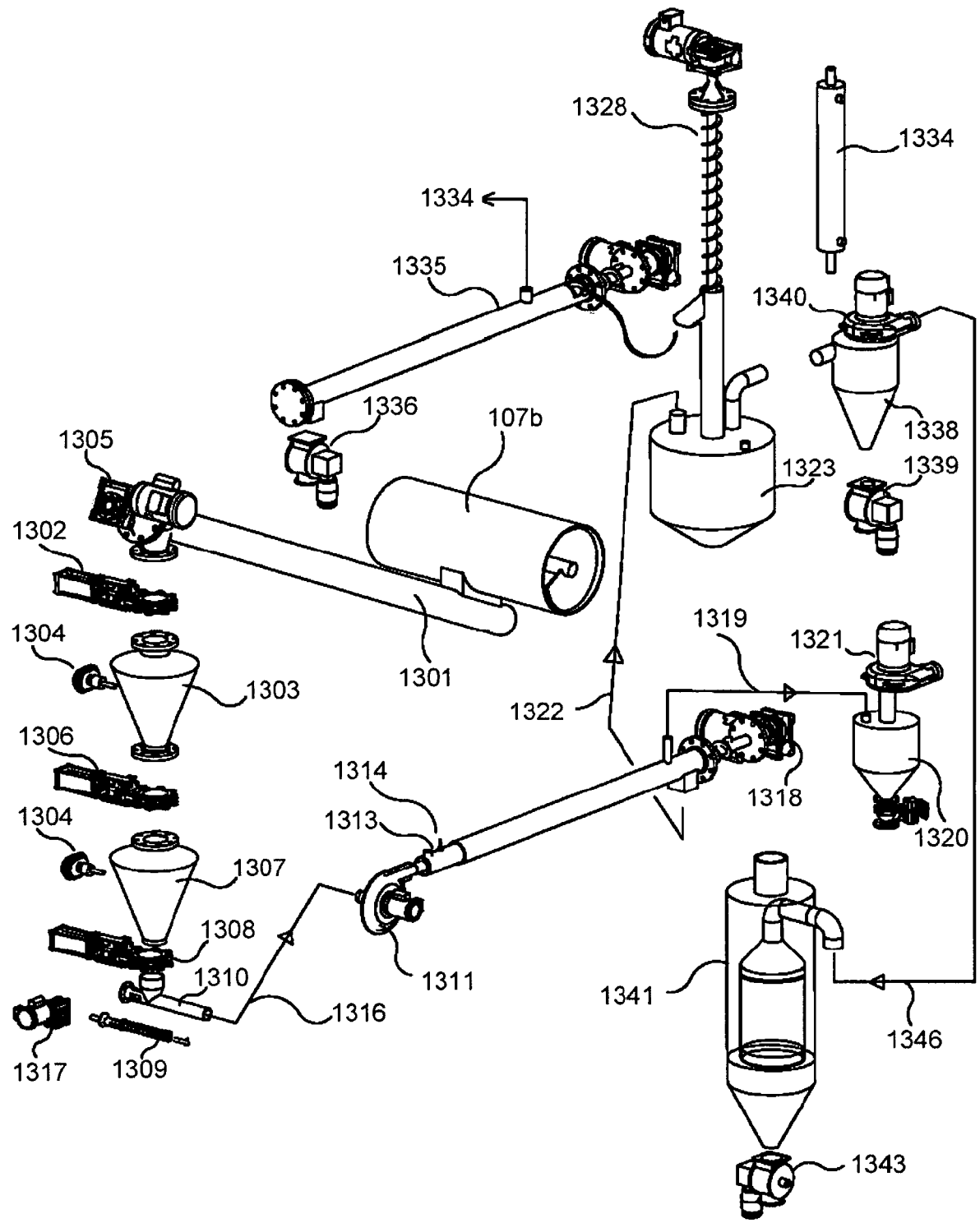
FIG. 14 illustrates the assembly of the carbon refiner.
Figure 15:
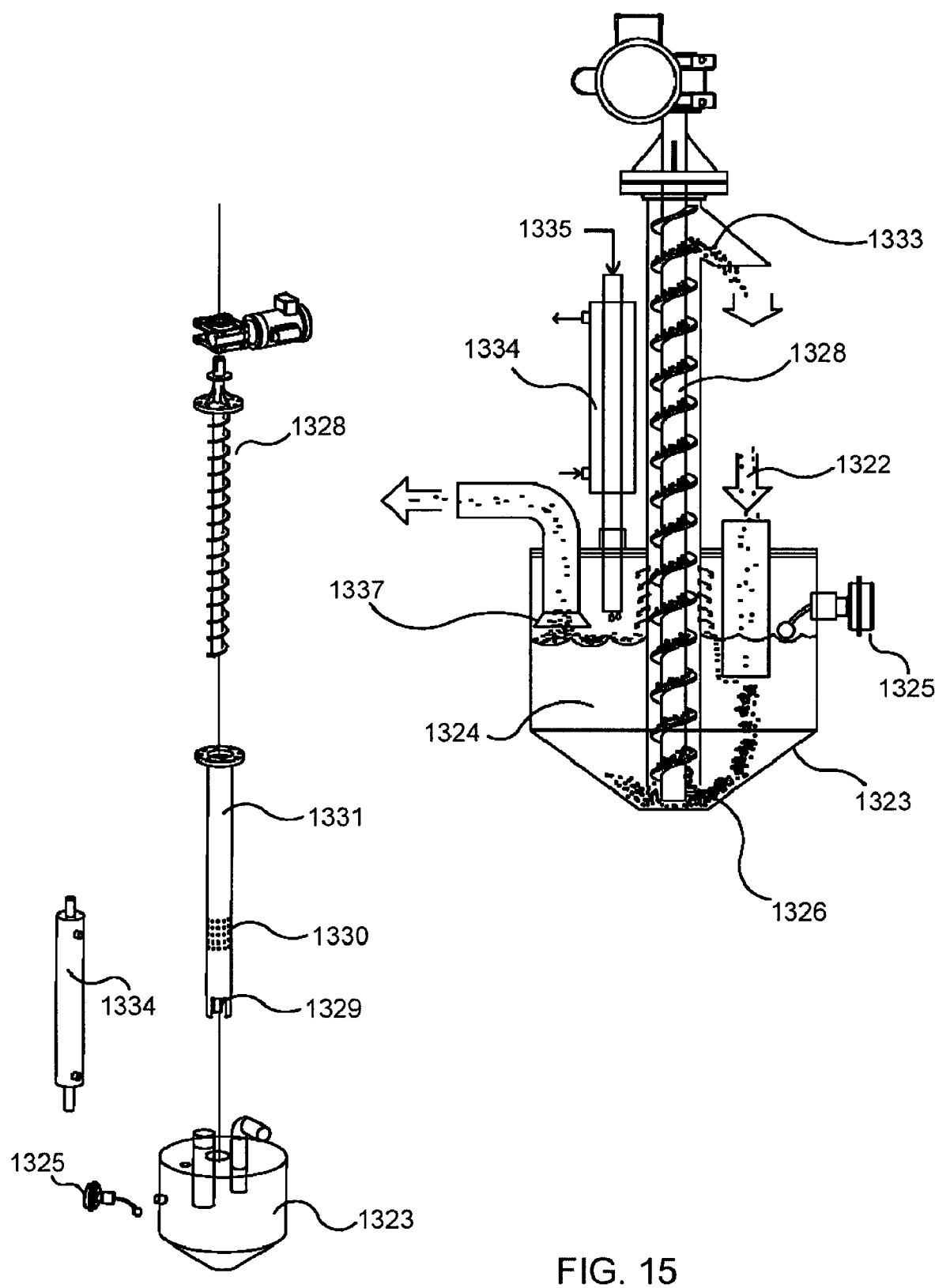
FIG. 15 is the assemble isometric view of the carbon refining separation system.
Figure 16:
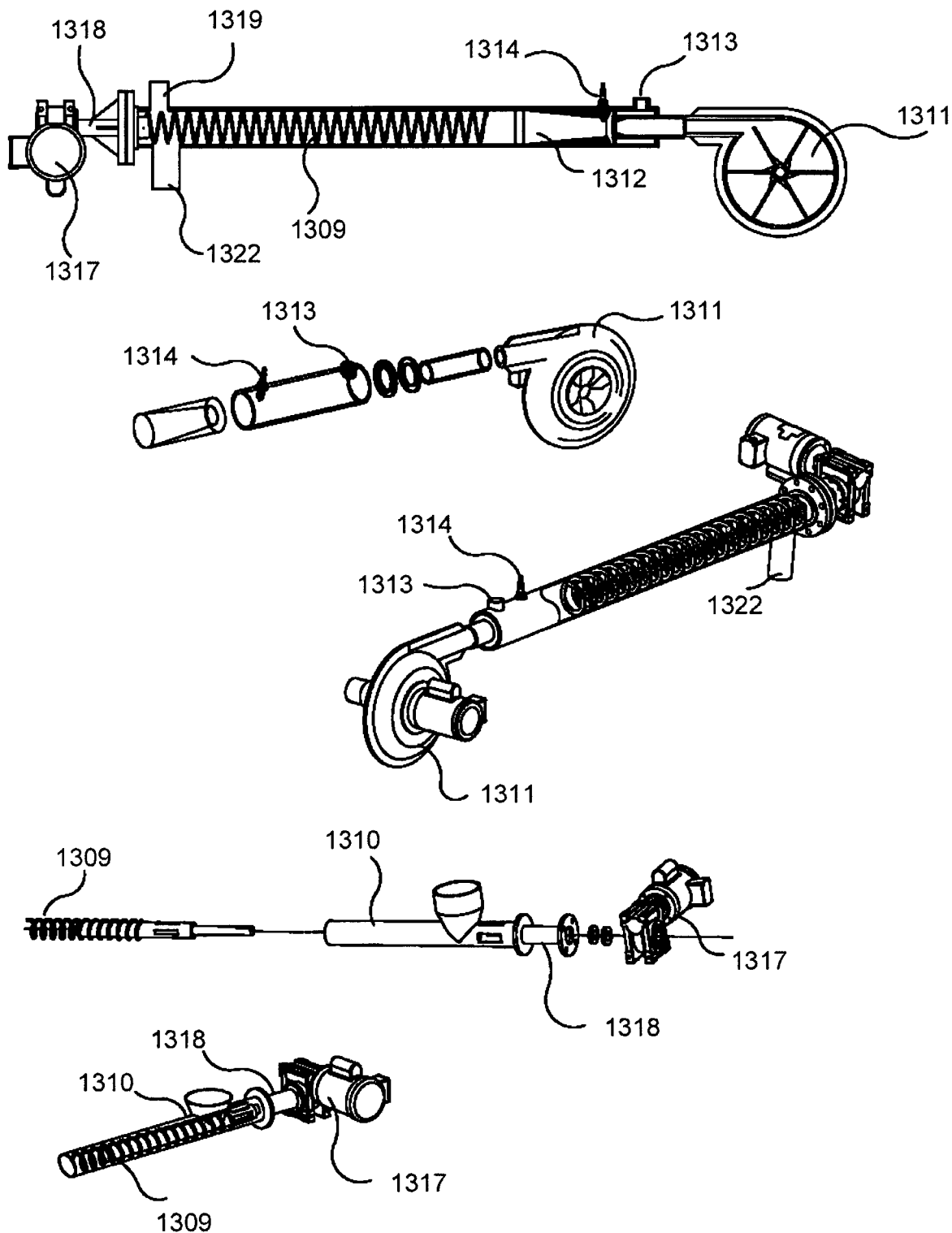
FIG. 16 is the assemble isometric view of the carbon refining reactor section.

The tire crumb material will enter into the air compressor 413 with a continuous flow and collected fuel FIG. 10, char/ash/carbon FIG. 13 being discharged. The heat is applied from burners 108 and is maintained on the system during the entire run without stopping to refill or discharge the char. The in-feed (FIG. 1) uses a material-based compression seal and the discharge (FIG. 13) uses a series of gates to create an airlock seal. This invention can use both shredded tire crumb material, large tire crumb material or small tire crumb material.

The pyrolysis reactor has burner boxes 601 that transfers heat through the side wall of the reactor tubes 602, 603 to vaporize the material inside the reactor tube as it is being conveyed. The tire crumb material along with any vapours will drop from the upper reactor screw 107a to the lower reactor screw 107b and continue being conveyed to the end of the lower reactor.

This invention combines vapour outlet and the feed system in one area. This area is fixed to the steel frame and not allowed to move when heat is applied to the pyrolysis reactor main tube. It expands away from this fixed point, allowing the feed system and exhaust system of the pyrolysis reactor to be stationary. The advantage of having the outlet port directly above the inlet is the advantage of capturing of lighter fuels.

The tire crumb material and vapours entering to the reactor end are pulled along the upper 107a and lower 107b reactor screws with double flight screws that has a cut and fold slots. The heat from the burner boxes 601 surround the reactor tubes creates high temperature that start the reaction. The tubes of the pyrolysis reactor will expand due to heat and travel in one direction because of being anchored by the heated feeder (FIG. 1).

This pyrolysis reactor makes the combination of enclosing the stacked reactor tubes with one burner box using only one burner per box. The upper reactor screw 107a will expand when heated and travel away from the feed end. At the same time, the lower reactor screw 107b expands in the opposite direction being fixed by the cross over section 402. The upper section pulls the lower section because of this crossover connection. So, if the upper and lower reactor tubes are heated the same temperature they will expand the same amount.

The burner box is insulated on the inside and reduces the heat that the outer skin will see. In turn, the burner box does not expand to match the reactor tubes so a sealed slip collar 610 is used to support the burner box to the reactor tubes.

A gap exist between each burner box where a roller support cart 605 can be attached to the reactor tubes. These roller support carts are bolted to the reactor tubes with an expandable clip. The base of the roller support cart uses a cam follower placed around a fixed flat bar landings 606 to prevent movement in the X and Z axis while keeping the reactor tube from warping.

A burner with dual inlets is used to heat the pyrolysis reactor. One gas will be for start-up and the other inlet to the burner is for syngas. A separate control box is used for each burner for control but monitored by the main PLC. Temperature probes 607 are used to control the reactor's temperature to a PID set point in the control box.

The movement of the pyrolysis reactor is in a lateral direction. The tube steel frame 608 has flat bar landings 606 for the roller support carts 605 to travel on. The roller support carts 605 have a cam follower roller 611 to hold the pyrolysis reactor from moving up or to the sides, allowing only allow the movement in the longitudinal direction of the reactor tubes. The upper reactor is tied to the lower reactor, being fixed by the connecting collar 402 between the upper and lower reactor and pulls the lower reactor along as it expands. The lower reactor expands in the opposite direction as it is being heated. Being at the same temperature, the upper and lower reactor tube expand at the same rate to keep the inlet burner box in place.

The drives 501 located at the ends of the reactor tubes, are also on a roller cart 502 to allow for expansion. The char/ash/carbon conveyor system is on rollers support to be pulled along with the pyrolysis reactor as it expands in the event of a mishap. The enormous advantage of the two-stack reactor invention is the combined length of expansion would be over 12" if stacked end to end. By stacking the reactor tubes 602/603 one over the other, the expansion is reduced in half. This also reduced the load on the upper reactor screw 107a and lower reactor screw 107b inside the pyrolysis reactor by reducing the length.

The whole system is protected with a nitrogen purge system 403. In the event of an emergency, the nitrogen gas will be piped into the pyrolysis reactor. This is an inert gas that will displace oxygen and prevent any incoming oxygen from entering the hot reactor by pressurizing the void inside the pyrolysis reactor. This gas can be used as a fire suppression system. The control valves can be configured to open under power failure if needed. The nitrogen ports to the pyrolysis reactor are placed in locations where the heat and vapour are the most concentrated.

About 90% of all the incoming tire crumb material will be vaporized in the upper reactor screw 107a and the remaining 10% in the lower reactor screw 107b. There is an opening at the opposite end in the lower reactor where any char will fall into an ash discharge auger 404 that will remove it from the pyrolysis reactor through an upper gate, middle gate, lower gate 1302/1306/1308. At this point the char/ash/carbon will be processed by the carbon refining processor system.

The re-boiled and vaporized fuel then travel into a standard heat exchanger shell and tube condensers 407 for cooling. The first condenser is attached on top of a holding tank where Carbon-chains that boil above 149° C. (300° F.) are collected. The remaining vapours then travel up and out, then back down through a chilled condenser on top of a finish tank. The finish tank also has a chilling coil supplied by a glycol chiller 408 that will condense the remaining Carbon-chains from C5 and above. This tank is set to around −6.7° C. (20° F.). The remaining vapours are now only non-condensable gas named syngas. The syngas then passes through a set of bubblers 409 to scrub the sulphur and other absorbable chemicals out of the gas stream. The cleaned syngas is then used to power the burners 108, and can also be used to power a generator 420.

Rotary Screen Cleaning Tower (FIGS. 4, 5, 7, 8 and 9)

The vapours are vented from the pyrolysis reactor and up through a rotary screen cleaning tower, which is very versatile in that by changing the RPM, the dwell time or the cooling time of the fuel and can be adjusted to allow for an increase or decrease of the dwell time. If the spinning paddles 704 were not moving at all, the gas vapours 720 or 721 would travel straight through the tower. This would be a relatively short length of travel. The vapours would not drop in temperature in such a short length of travel (about 3 seconds). The gas that entered the system's tower along with the carbon particles 722 would travel straight through. To change the temperature of the vapour to allow for some condensation, the length of travel or dwell time must increase. With the spinning paddles 704 rotating, they cause the vapours to circulate between the screen plates 703. Before rising through to the next screen plate, the rotating paddles makes a coil path for the vapours. By turning the spinning paddles faster or slower the coil path length of gas vapour 720 or 721 is increased or decreased. This changes the dwell time allowing for more cooling time, so the heavier fuel vapours or Carbon-chains condense inside the rotary screen cleaning tower. These condense vapours and absorb any carbon particles 722 it comes into contact with. In addition to creating a coil effect for the vapour path, the spinning paddles creates kinetic and centrifugal energy 724. The kinetic energy forces the condensed gas vapour 720 on the spinning paddles 704 to be pushed through the remaining gas vapour 720 and multiplies the amount of contact time that the liquid fuel has with any carbon particles 722 so they get absorbed by the liquid. The centrifugal energy created by the spinning paddles 704 causes the vapours also to spin. The centrifugal movement of the vapours are pushed to the rotary screen outer housing 713 for the condensed fuel to now running down the tower sides 713 and return to the reactor below 728.

The spinning paddles 704 along with the screen plates 703 created back pressure inside the tower. The use of a fan wheel 705 at the top of the screens pulls the vapours upward and out of the tower outlet 702 through a pipe 730 and into a fuel cleaner 901. This fan wheel removes the back pressure created by the screen. The faster the main shaft 737 turns, the more time it takes the vapours to travel and the more backpressure will build. But with the fan wheel sized to match the screen pressure, it spins at the same RPM to match that pressure. The slower the cleaner turns the less pressure is needed and the fan wheel, being attached, matches the needed pressure.

A standard screen would allow a build-up of carbon laden fuel to plug their openings. In this invention, the top surface of the screen plates 703 has screen tapered slots 727 following the spinning paddles path. The screens tapered slots also taper in the direction of the spinning paddles from smaller 726a and larger 726b in a teardrop shape 727. This allows for expansion, not compression. When cake like material is compressed it tends to stay together and plug an opening. On the other hand, when expanded, it tends to break apart which helps clean the opening.

The screen tapered slots 727 are also machine tapered 718 from the top of the plate to the bottom of the plate 718. This also give it an expansion area and allows the material to drop out of the screen plate. The outer housing 713 of the cleaning tower is tapered too. This gives it a negative side wall. This shape helps the liquid material, along with any captured carbon, to flow downward and back to the gas vapour 721.

Most of the condensed vapour liquid fuel will be in contact with the housing wall because of the spinning paddles forcing them there. The screen plates have half the same tapered slot 723 along the contact point of the outer housing 713 to allow material to flow through.

The heavier condensed fuel with its captured carbon particles will flow down the wall and return to the reactor below. The returned fuel, along with the carbon, will enter into the pyrolysis reactor and become reheated. The reheated fuel will then vaporize and separate from the carbon particles.

The thermal effect of the pyrolysis reactor to the fuel will also crack some of the fuels into shorter Carbon-chains making a percentage of the return fuel pass through the cleaning tower leaving the carbon particles 722 behind.

The rotary screen cleaning tower is powered through an electric motor 714 through a gear box 706. The solid main shaft 737 is attached through the gear box 706 and down to the last screen plate 703 inside the tower. The main shaft 737 has the spinning paddles 704 attached and the fan wheel 705 is bolted at the top.

The screen plates have a cross shaped opening 725 that allows for the spinning paddles to pass through during installation. The fan wheel 705 is bolted to the main shaft 737. This invention allows for replacement of the type of fan wheel required to match the recommended back pressure balance. The screen plates 703 are bolted through the housing 713 wall, so they too can be replaced with plates that have more or less screens tapered slots as needed.

The motor mount 707 is elevated to reduce heat transfer to the gearbox 706. A spring-loaded packing seal 709 separates from the atmosphere. The housing of the packing seal 709 is welded to the top flange 801. Thermocouples 712 are used to read the internal inlet and outlet temperatures. This temperature determines the type of Carbon-chains to be condensed based on its boiling point. A pressure differential gauge 802 is also used to indicate the amount back pressure across the screens. These two indicators give feedback to an operator to control the cleaner.

Exhaust Heat Fuel Cleaner (FIGS. 4, 5, 10, 11 and 12)

Figure 11:
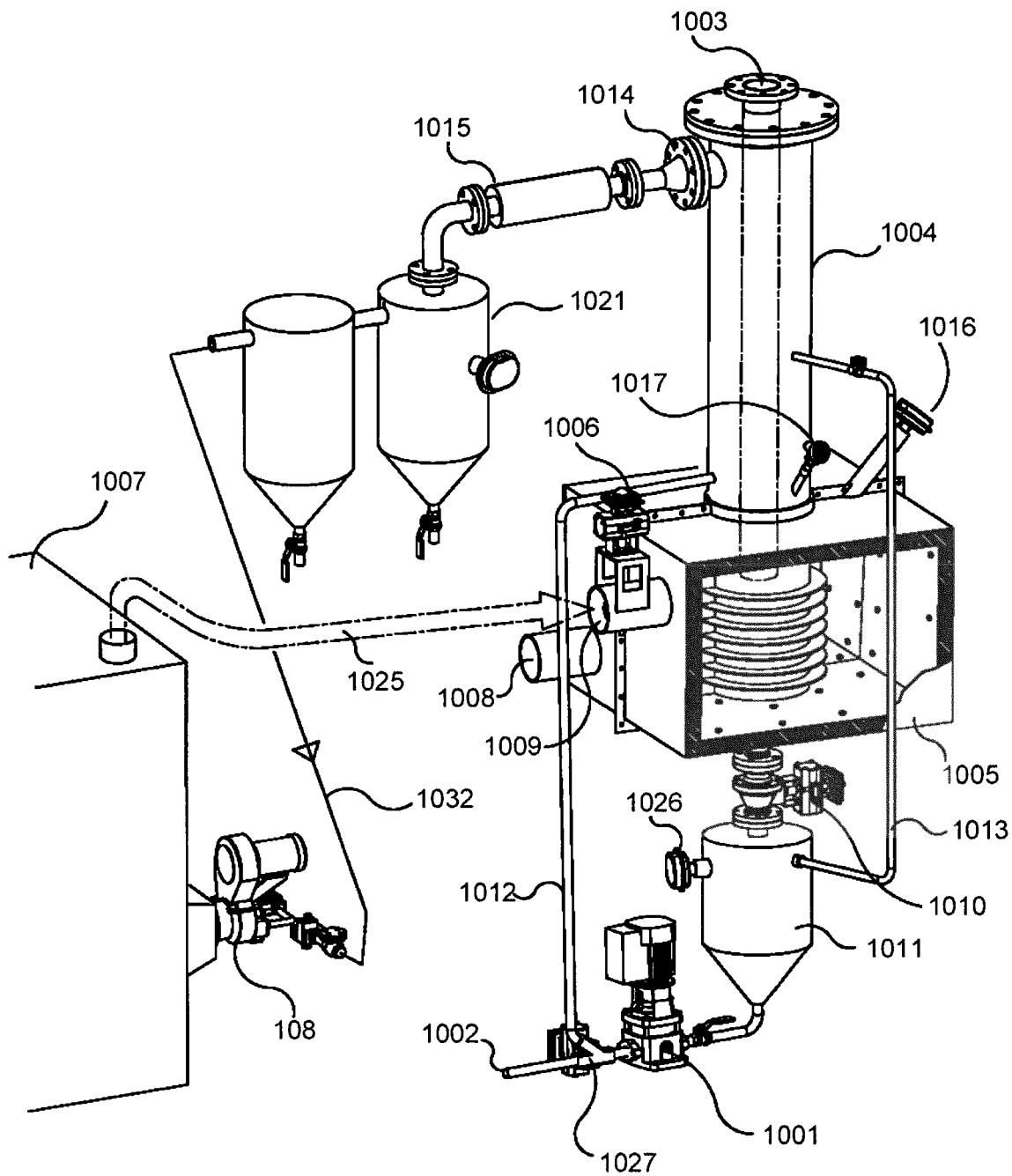
FIG. 11 is the component isometric view of the items making up the exhaust heated fuel cleaner.
Figure 12:
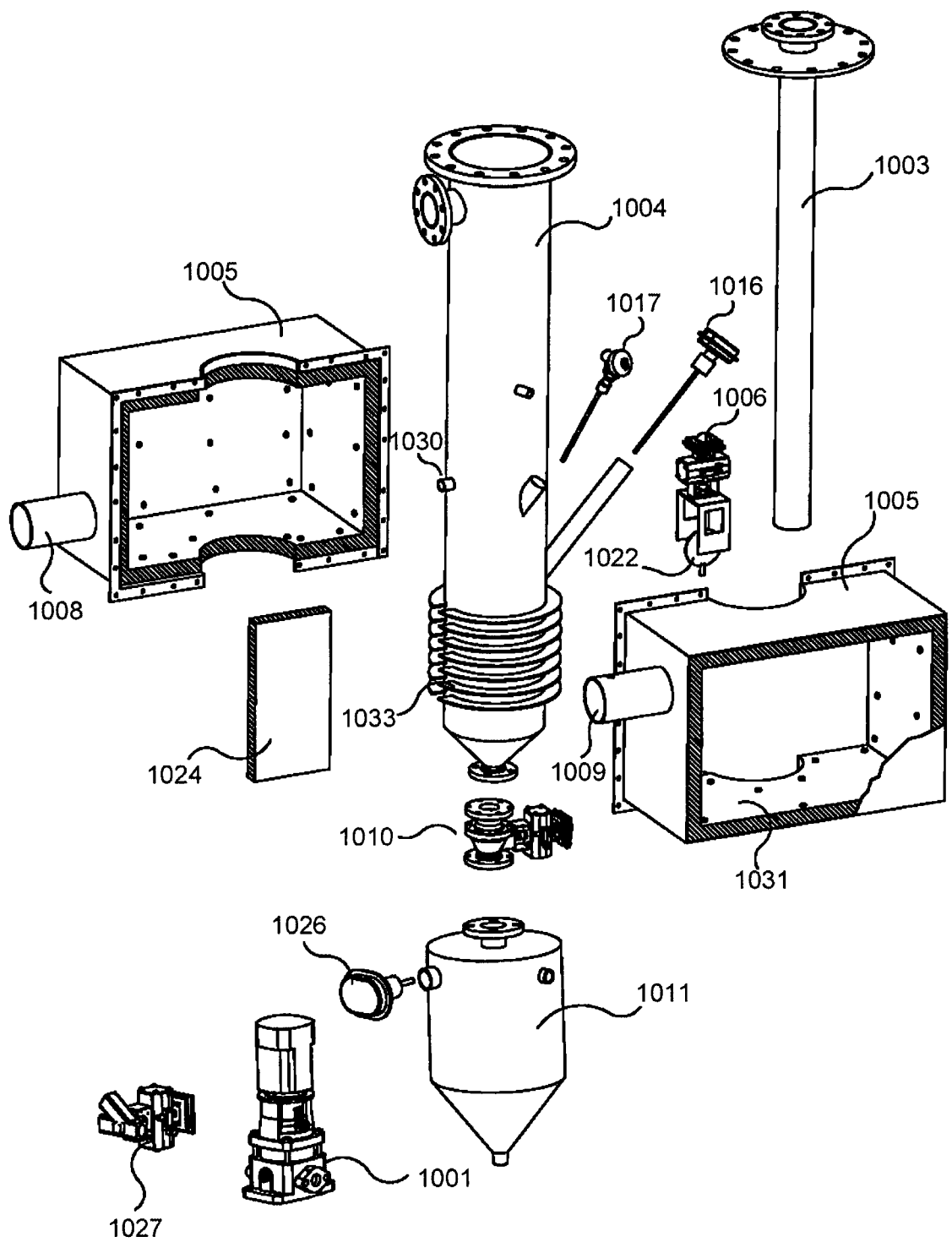
FIG. 12 is the assemble isometric view of the exhaust heated fuel cleaner components.

After passing the screen cleaning tower the vapours travel to the exhaust heated fuel cleaner shown in FIGS. 10, 11 and 12 where any carbon particles are removed. The vapours that condenses below 260° C. (500° F.) will condense and then re-boil into vapours leaving the heavier fuel behind. This heavy fuel, along with the carbon particles, will be pumped 1001 back to the pyrolysis reactor 1002 for thermal cracking and to deposit the carbon back in the pyrolysis reactor.

FIG. 11 shows the assembly of the exhaust heated fuel cleaner. An inlet tube 1003 is inserted into the main housing 1004 and down to the split insulated metal enclosure 1005 to a point below the cleaner fuel inside. The main housing 1004 is sandwiched between a split insulated metal enclosure 1005. A control valve 1022 is installed between the process reactor exhaust 1007 and the split insulated metal enclosure 1005 to supply heat to re-boil the fuel.

The exhaust outlet port 1008 and heat inlet port 1009 are used to penetrate the enclosure for exhaust heated air circulation inside the main housing 1004. A discharge valve 1010 is bolted between the main housing 1004 and the discharge holding tank 1011. The discharge holding tank 1011 is piped to a pump 1001 and then piped to a diverter valve 1027. Fuel is pumped to the pyrolysis reactor 1002 for extra thermo-cracking or diverted back to the cleaner 1012 to maintain the level indicator. A vent pipe 1013 is installed between the main housing 1004 and the discharge holding tank 1011.

The outlet port 1014 can be directed to a condenser 1015 and the remaining syngas to pipe 1032 to the process burner 108 on the reactor burner box. Sensors are installed to control temperature 1017 and level indicator 1016.

This invention corrects the problem of contaminated fuel by removing the carbon particles from the vapour stream. The vapours leave the pyrolysis reactor and are pushed by pressure built up in the pyrolysis reactor into the inlet tube 1003.

The vapours along with the carbon, travel down the inlet tube 1003 and are pushed through the stored boiling fuel and are collected in the lower section of the main housing 1004. The fuel and carbon come in contact with the hot boiling liquid fuel re-boils, turns into clean fuel vapour and is pushed up and out of the cleaner.

Cooling vapours reduce volume and the vapour along with the carbon coming in contact with the liquid fuel stored below 1019. This makes the carbon absorbed some of the liquid and become heavier than the boiling fuel. At that point it will dislodge from the vapour stream and be pulled into the liquid, sinking to the bottom of the lower area of the cleaner housing storage where the incoming exhaust heat is present.

The incoming vapour will drop in temperature slightly and the percentage of the vapour will remain in a gas state. The boiling fuel will evaporate any collected condense vapours and re-boil them into a vapour removing thereby the carbon particles. The weight of the fuel is known as the C—chain and will be determined by its boiling point temperature.

The set point of the boiling fuel will vaporize any Carbon-chains below the set point temperature. This re-boiled vapour will be pushed out of the cleaner though the outlet port 1014 into a condenser 1015 and holding tank 1021 where the temperature drops and turns the vapour back to a liquid without carbon particles. The non-condensable gases are pushed through the system and introduced into the burner 108 creating heat for the pyrolysis plant.

The stored cleaner fuel will boil off if the temperature set point is higher than the boiling point of the liquid, creating low volume level in the cleaner fuel. The opposite will occur if the temperature set point is lower than most of the stored cleaner fuel. This will create a build-up above the recommended level in the fuel cleaner storage area. The heat to the cleaner is provided by the process reactor exhaust 1007. The exhaust can reach as high as 1093.3° C. (2000° F.) so a control valve 1022 and a thermocouple 1017, along with a controller 1023 and actuator valve 1006, are used to regulate the required heat exhaust to maintain set point temperature.

The hot air 1025 travels from the burner box through the process reactor exhaust 1007 controlled duct into the split insulated metal enclosure 1005 and travels around the split insulated metal enclosure 1005 and then is vented out. An insulated wall 1024 stops the hot air 1025 from by-passing the split insulated metal enclosure, creating an even heat for the cleaner. The boiling fuel inside the cleaner has a height just past the inlet tube 1003 bottom. This gives the incoming vapour a bubbler effect that exposes the gas vapour to liquid fuel where separation occurs.

This fuel has a natural separation of fuel weight based on the Carbon-chain value. The heavier fuels will tend to sink and the lighter fuels tend to rise where a higher heat will vaporize it. The heavier fuels will sink toward the bottom along with the carbon where it will be removed and return to the pyrolysis reactor for re-cracking and carbon separation.

The discharge fuel leaves the cleaner through a discharge valve 1010 and enters the discharge holding tank 1011 from the level is triggered by a set point from the level probe 1026. When the level is reached, a pump 1001 pushes the discharge heavy fuel along with the carbon particles to either the pyrolysis reactor 1002 or back to the cleaner 1012 to adjust the level as needed by use of a diverter valve 1027.

A vent pipe 1013 is piped between the discharge holding tank 1011 and the main housing 1004 and is directed by a check valve 1028. A level indicator 1016 is used to maintain the height of the boiling cleaner fuel. This level indicator triggers, either to drain the unit slightly or to refill with discarded fuel. The height of boiling fuel above the inlet tube 1003 is critical to perform proper cleaning.

The deeper the inlet tube 1003 is submerged in the boiling cleaner fuel, the longer the exposure time to the liquid the longer exposure time has the carbon to be absorbed. But this creates a higher back pressure on the pyrolysis reactor. So, based on the needed back pressure, the depth of the inlet tube 1003 in relationship to the depth of the boiling cleaner fuel is critical. The depth of the inlet tube under the liquid created the pressure inside the pyrolysis reactor. It takes pressure for the vapour gas to push through the liquid. The deeper the inlet tube, the more pressure it takes to make the gas pass through the liquid.

The main housing 1004 is made of high heat low corrosive materials. The top, bottom and exit port have welded flanges for seal connections. Heat absorbing fins 1033 are welded to the main housing on the lower section where heat is applied. Couplings 1030 are attached for the level indicator 1016, return fuel and thermal coupling probe 1017. The inlet tube 1003 has a matching flange to mate with the main housing 1004. The inlet tube 1003 length is set to allow adequate submersion into the cleaning fuel.

A split insulated metal enclosure 1005 with high R-value installation 1031 is bolted inside and sandwiched around the split insulated metal enclosure 1005 and holds the divider wall 1024 in place. The split insulated metal enclosure 1005 as both a heat inlet port 1009 and an exhaust outlet port 1008 for the pyrolysis reactors burner exhaust system to inner and exit. An actuator valve/control valve 1006/1022 is installed in the heat inlet port 1009 to control the heat inside the main housing. The computer control discharge valve 1010 is bolted to the main housing 1004 at the bottom. A discharge holding tank 1011 is bolted to the discharge valve 1010.

A level indicator 1026 is used to control the liquid level inside the discharge holding tank 1011. A pump 1001 removes the collected fuel as needed. A diverter valve 1027 is installed after the pump and selects direction of the discharge fuel.

Carbon Refiner (FIGS. 4, 5, 13, 14, 15 and 16)

The carbon char is discharged from the pyrolysis via a lower reactor screw 107*b* and through a gated airlock arrangement. The upper gate 1302 remains opened as the ash discharge auger 1301 is running. The char fills the first hopper 1303 below and trips an ash discharge auger 404.

This will stop the ash discharge auger 404 by killing power to the drive 1305 and close the upper gate 1302. The middle gate 1306 will open and deposit the char to another lower hopper 1307 and reclose the middle gate. The upper gate will open and start the char auger process again. The lower gate 1308 will now open and feed the metering screw 1309 below that rotates in a hollow drive shaft 1310 and has matching air openings. The metering screw 1309 has a hollow drive shaft 1310 to allow air movement through it.

The metering screw 1309 turns and forces char into the air stream (via duct 1316) created by the burner blower 1311.

This burner blower supplies air for combustion of the supplied gas 1313 (liquid propane or syngas made by the pyrolysis process).

Carbon char, along with the air, entrances into the combustion chamber 1312 where it is ignited by a spark plug or pilot flame 1314. The force from the blower mixes the char with the air and when it comes into contact with the flame and drives off any hydrocarbons and will incinerate them along with any combustible material in the stream. A metering screw 1309 inside the chamber will pull the carbon to a discharge opening 1322 at the other end.

The slow revolution of the coil metering screw prolongs the exposure time of the char material to the flame and can be adjusted as needed by the use of a motor drive 1317 invertor. All drives are supported and seal with a packing seal 1318. The burner blower 1311 needs a path for pressure relief or the back pressure will stop the air flow and extinguish the flame, so a vent line 1319 is attached to the opposite end of the chamber.

The vent line 1319 runs thought a water bubbler 1320 and is pulled with a vacuum source 1321 to balance the back pressure of the burner blower 1311. The water in the vent bubbler also removes any airborne particles and will absorb chemicals like sulphur. The heaver char is now refined carbon and is conveyed to the discharge opening 1322 where it drops into a separator tank 1323.

Water level 1324 is controlled by a typical level switch 1325 in the separator tank 1323 that allows the heavy carbon 1326 to sink and the ash or remaining char 1327 to float. The carbon that sinks is collected at the bottom of a separator tank 1323.

A vertical lift auger 1328 is used to pull the carbon out of the separator tank through an opening 1329 at the openings 1330 and drains the water from the carbon through openings 1330 in the lift tube 1331. The carbon is then deposited 1333 into a horizontal screw auger 1335 that passes through the burner box 601 where heat is applied to the auger wall.

This heat drivers off the water and returns it to the separator tank 1323 through a condenser inline 1334. The condenser cools the water vapour back into a water state. The dry carbon in the horizontal screw auger 1335 then passes through a first airlock 1336 and to containers The ash and char that floats 1337 inside the separator tank 1323 is vacuum off the top and pulled into a cyclone 1338 for collection. A second airlock 1339 is also used at the discharge of the cyclone for removal.

The vacuum used to pull the char and ash is from a blower 1340 mounted on the top of the cyclone 1338. The blower then pushes its exhaust 1346 into a bag filter 1341 where any dust collected 1342 can be collected and discharged via a third airlock 1343.

Figure 4:
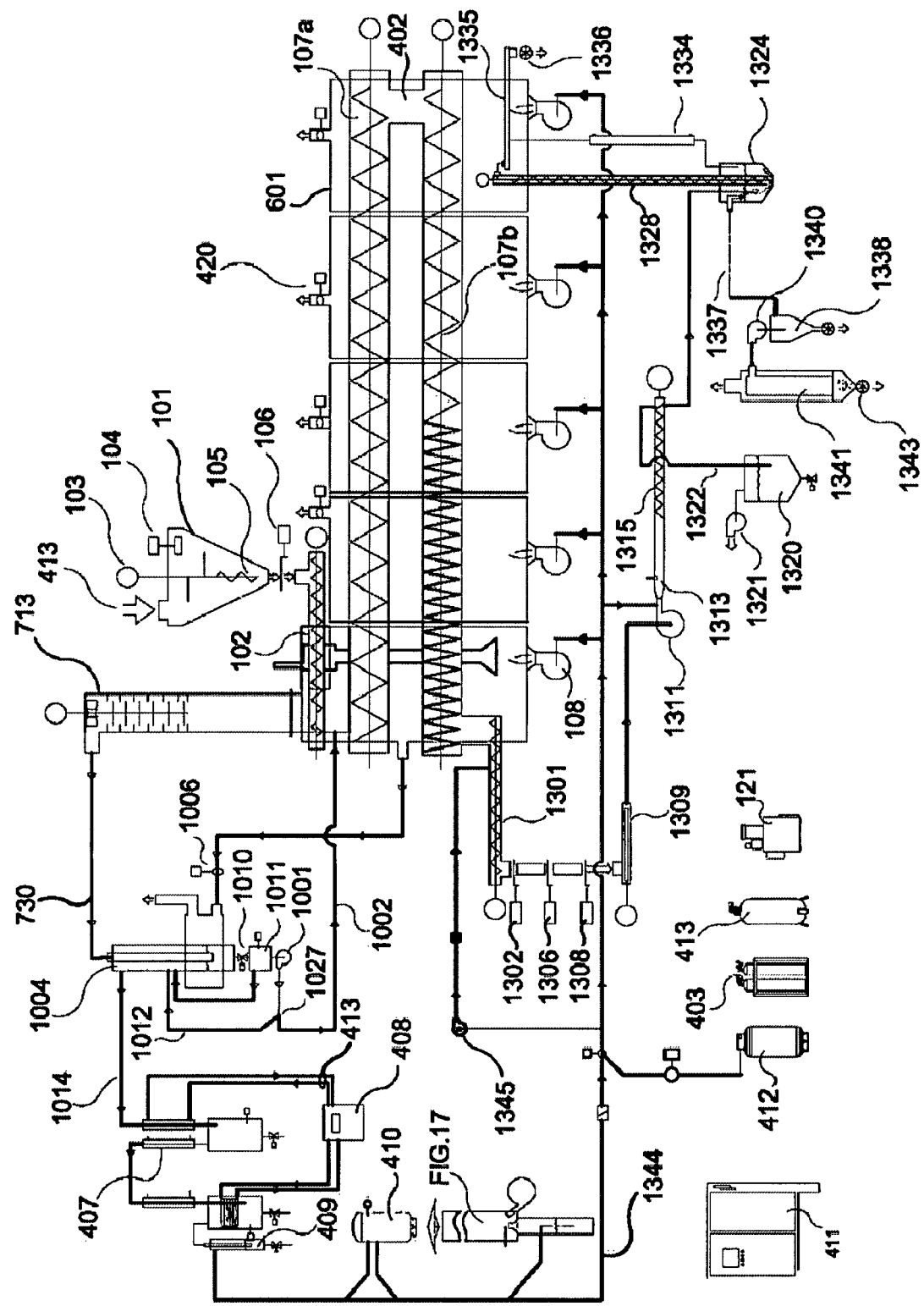
FIG. 4 is a simplified depiction of the pyrolysis reactor system.
Figure 5:
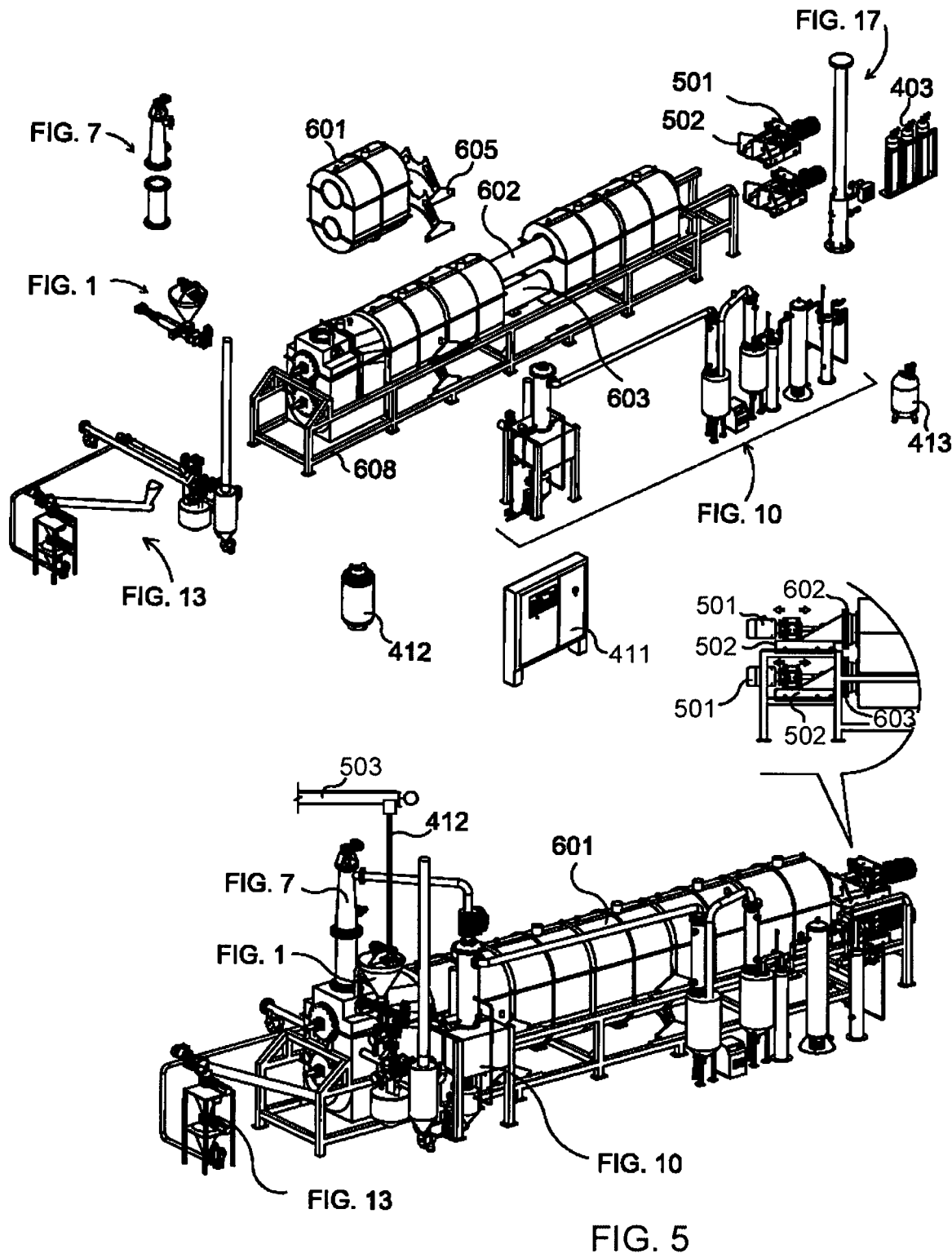
FIG. 5 is an isometric view of the reactor system.
Figure 6:
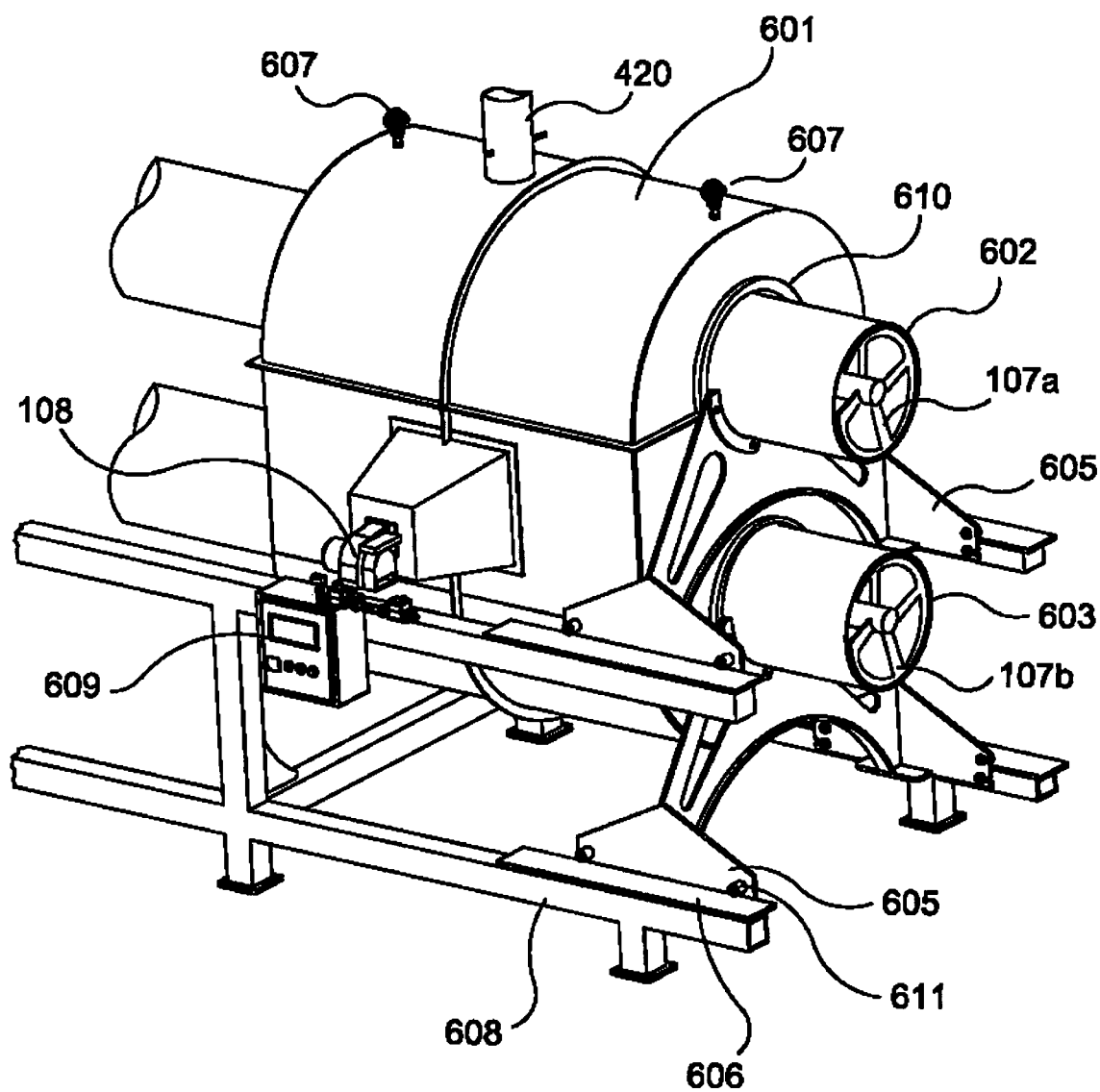
FIG. 6 shows an isometric representation of the pyrolysis plant burner box, the reactor tubes and support.
Figure 7:
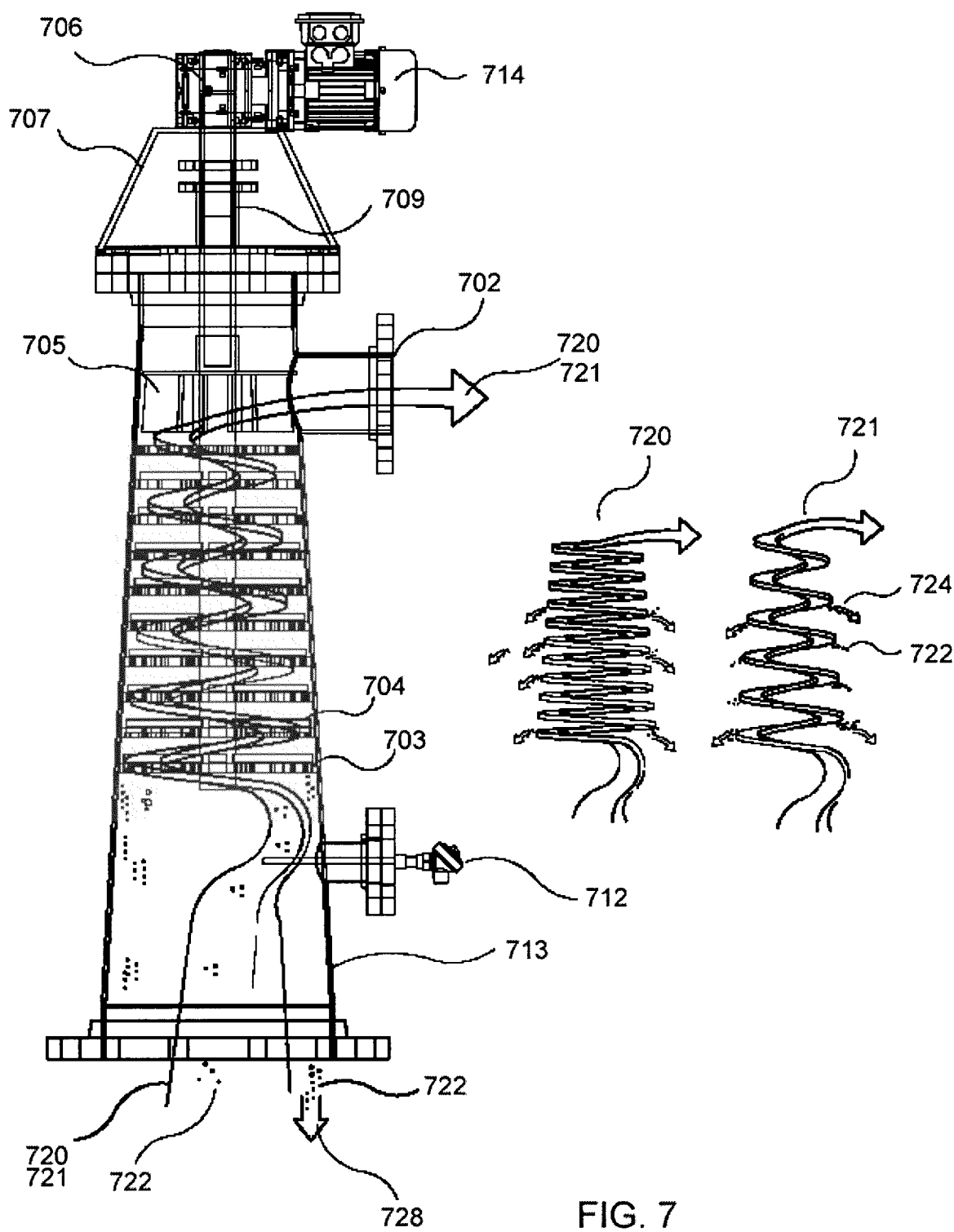
FIG. 7 shows the assembly of the cleaning tower and the vapour coil effect.
Figure 8:
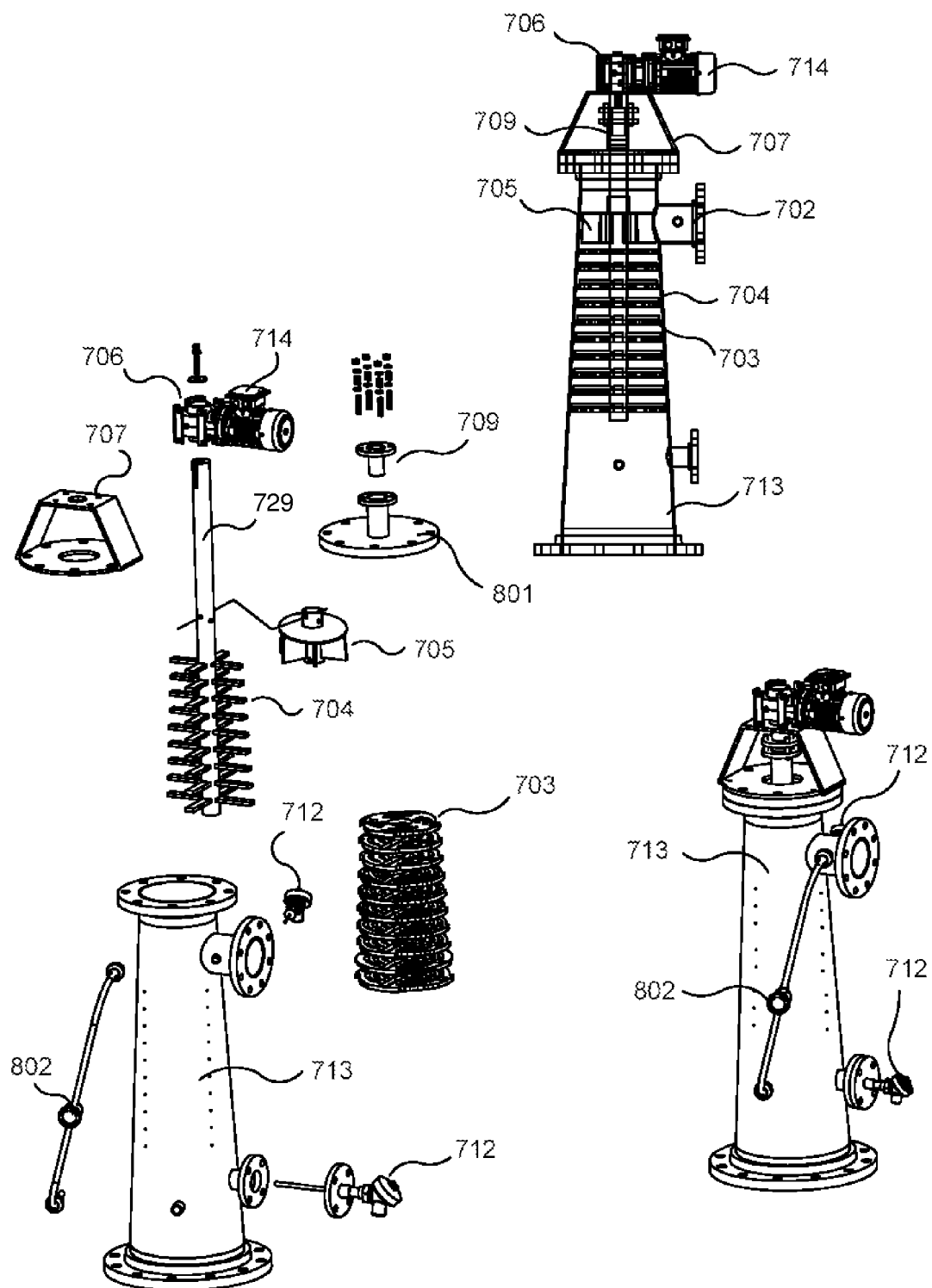
FIG. 8 illustrates the assembly of the vapour cleaning tower.
Figure 9:
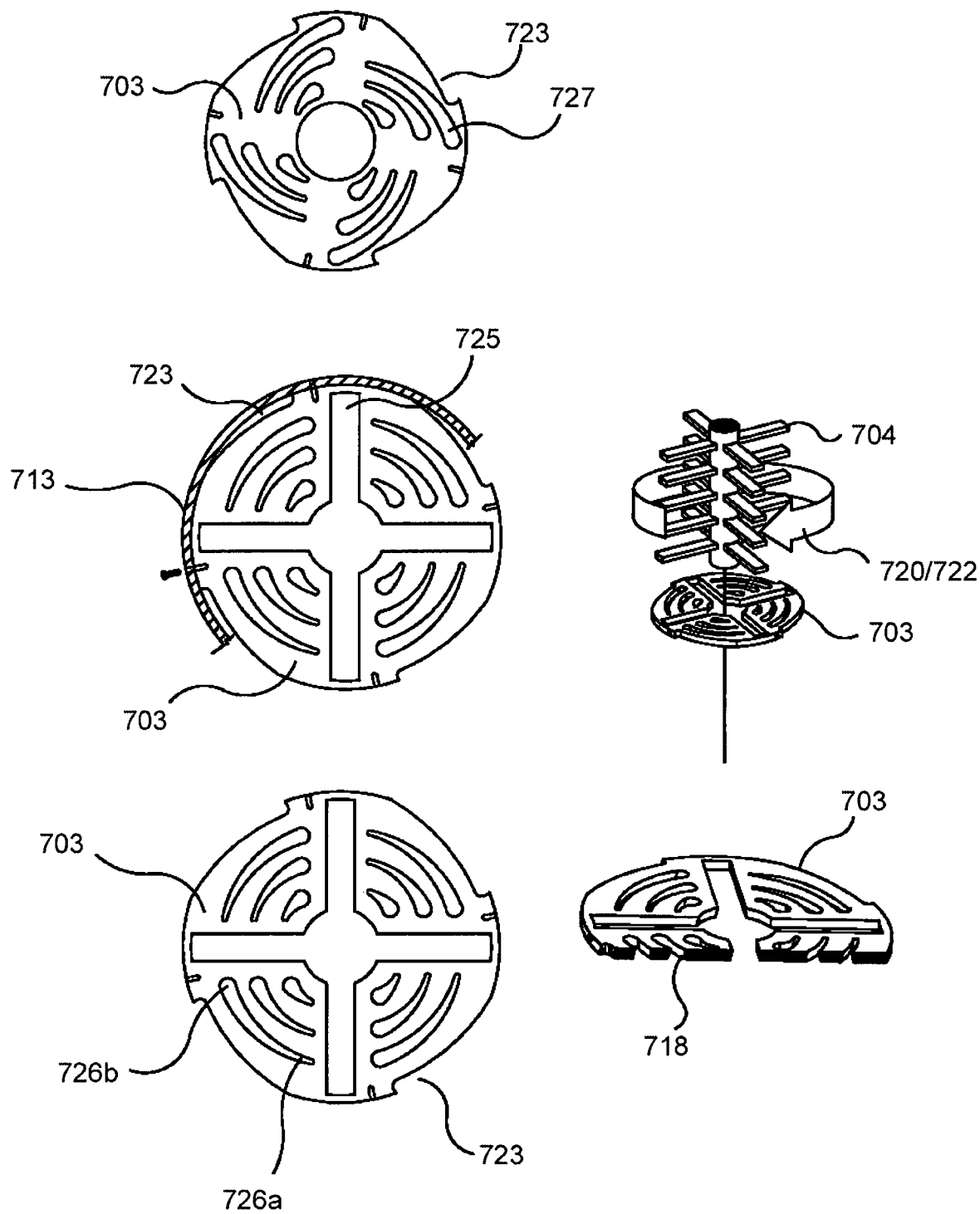
FIG. 9 is a detail of the teardrop expansion slots and tapers of the screen plates for the vapour cleaning tower.
Figure 17:
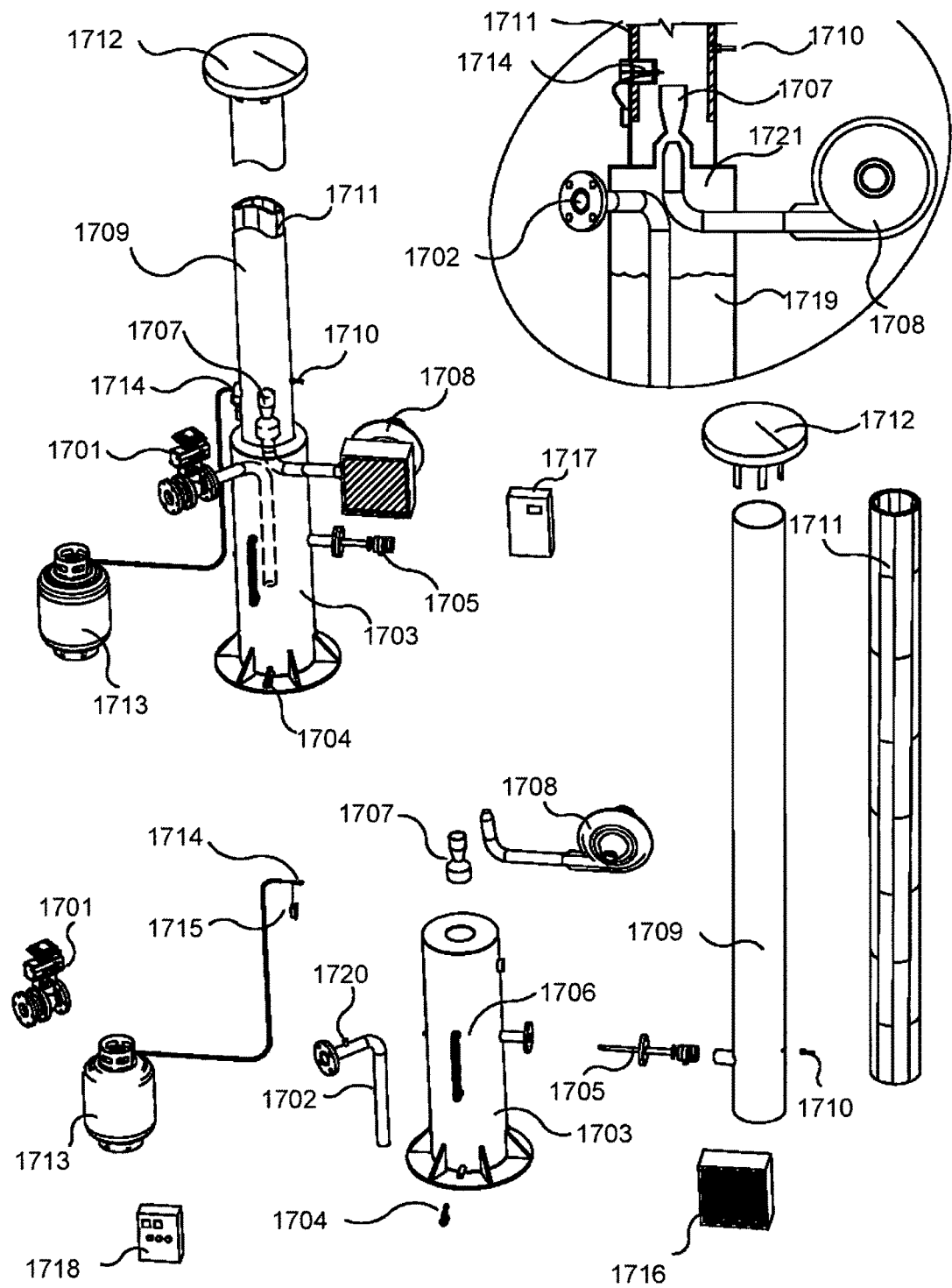
FIG. 17 shows three views of the safety burner where first view is an assembly and the second view is an isometric view of the components and the third view is a detail of the venture nozzle area.

Safety Burner Tower (FIGS. 4, 17)

Shut down of the system requires that the burners 108 to the reactors to be shut off while the fans continue to run. The input of air only greatly reduces the cooling time. But the process is still producing syngas until the reactor temperature is below 204° C. (400° F.). The syngas must be either stored 410 or consumed to allow the pyrolysis reactor to be vented of this gas.

A high volume, low pressure tank would be required or the gas can be burned off FIG. 17. A safety shut down burner will combust all the vented syngas by using a standard modulating burner piped into a vented burn chamber. When the syngas volume drops due to the cooling of the pyrolysis reactor, the burner matches the gas volume so the air to gas ratio is efficient.

A standard burner uses the process gas in a standard dual burner. This is piped inside a tower tube where the flames are shielded from the atmosphere. The burner pushes the flames up inside the tower and maintain the needed heat for incineration. The air to gas mixture is set to allow for complete combustion of the process gasses. The gas discharge is now only standard burner exhaust gas without any visible discharge.

A filtered 1716 blower 1708 with a variable speed control is used to match the gas to air ratio. A sensor to measure the incoming gas transmits information to a computer 1718 that calculates the ratio and adjust the blower speed. The incoming gas enters through an inlet valve 1701 and through a pipe 1702 and then below the bubbler chamber 1719 and into the safety burner housing base 1703 where it bubbles under the bubbler chamber 1719. This bubbler chamber 1719 absorbs sulphur and acts as a flame arrestor. The syngas then bubbles up into the bubbler chamber 1721 above the water line where it gets pulled into the blower 1708 air stream through a venturi nozzle 1707. A pilot light 1714 is placed above the venturi nozzle 1707 outlet where the mixture is ignited. The resulting flames are inside an insulated area 1711 where the heat is allowed to climb over 2000F and complete incineration accurse. The exhaust discharge gasses are like standard propane burner discharge gasses. There is no smoke exhausted from the safety burner stack.

To start up the safety burner an inlet valve 1701 is closed and compressed air is pumped through a port 1720 and into the bubbler chamber 1721, forcing any combustible gasses into the venturi nozzle 1707 where the blower 1708 air velocity will put it into the air stream. The clean air will run for 90 seconds to purge the stack 1709 and bubbler chamber 1721. The compressed air will stop and the inlet valve 1701 will open allowing syngas to now bubble through and be mixed with the blower air. A pilot light 1714 will ignite the mix and a flame sensor 1710 will confirm ignition. If the mix is not ignited, the purge process will repeat.

Standard process equipment is used to maintain water level, a level switch 1705 and a sight glass 1706 plus drain and refill valves 1704. Fire resistant insulation 1711 is used inside the frame area and a vent cap 1712 installed outside to prevent rain or snow from entering the safety burner.

A standard industrial igniter 1715 controls the burner while a PLC monitors the values of the safety burner system.

Liquid propane 1713 or natural gas can be used for the pilot light flame. Support Equipment (FIGS. 4, 5, 6 and 17)

The total process is monitored and controlled by a PLC program located in a main control panel 411. This is a standard in the industry. The burners 108 are required to have independent controls 609 to meet the required standards.

The pyrolysis reaction need heat to make the syngas that supplies the burners, but unless the syngas is stored, a start-up gas is needed. Liquid propane 412 is very close to the same properties of the syngas, so it is the first choice to use purchased bottled LP gas for start-up. Other gases can be used but the supporting valves and regulators need to match the fuel being used for start-up.

The vaporized tire crumb material is condensed into a liquid fuel by use of standard heat exchanger shell and tube condensers 407. The finish tank is required to drop the vapours to around −6.7° C. (20° F.) to condense all Carbon-chains above C-4 into a liquid. To ensure that all the vapours are condensed, the finish tank has a set of coiled path tubes in a chilled glycol bath inside. The glycol will not freeze and is used in the industry for chilling. A compressor type chiller system 408 is used for all the condenser cooling.

Air compressor 413 powers all the pneumatic valves, cylinders and gates while a hydraulic power system 121 powers the feed hopper and twin-screw drives.

If a power failure were to occur, the ability to burn off the gas is vital. So, a battery backup 1717 is supplied to ensure that as the pyrolysis is cooling down, the built-up syngas can be safely removed. A computer 1718 attached the battery back-up is also used for the same reason.

The whole plant is protected with a nitrogen purge system 403. In the event of an emergency, the nitrogen gas will be piped into the pyrolysis reactor. This is an inert gas that will displace oxygen and prevent any incoming oxygen from entering the hot reactor by pressurizing the void inside the pyrolysis reactor. This gas can be used as a fire suppression system. The control valves can be configured to open under power failure if needed. The nitrogen ports to the pyrolysis reactor are placed in locations where the heat and vapour are the most concentrated.

While the invention herein describes and disclosed the connection with a preferred embodiment. The description is not intended to limit the invention to a particular embodiment as shown and described herein, but rather the invention aims to cover all alternative embodiments and modifications that fall within scope of the invention as defined by claims included herein.

The invention claimed is:

1. A Pyrolysis plant comprising an exhaust heated feeder, a pyrolysis reactor, a rotary screen cleaning tower, an exhaust heat fuel cleaner, a carbon refiner, a safety burner, wherein:
   a) the exhaust heated feeder at least comprises: a receiver hopper having a vertical ram screw with bridge breaker arms and a pneumatic or hydraulic drive; a photo eye sensor or paddle switch; a slide gate; a twin screw feeder, having a twin screw housing, two screws of which one screw with left-hand flights and the other screw with right-hand flights, a pneumatic or a hydraulic power system, having a gear speed reducer, and having a heated collar;
   b) the pyrolysis reactor at least comprises: an upper reactor screw and lower reactor screw with double flight screws having a cut and fold slots; burner boxes having one dual gas burner per box, a sealed slip collar to support the burner box on the reactor tubes, roller support carts, a tube steel frame having flat bar landings for the roller support carts, the roller support carts have cam follower rollers; drives on the drive support roller carts;
   c) the rotary screen cleaning tower at least comprises: a fan wheel; spinning paddles; screen plates having tapered slots which taper in the direction of the spinning paddles from smaller and larger in a teardrop shape; a cleaning tower housing; a main shaft; and an electric motor with a gear box;
   d) the exhaust heat fuel cleaner at least comprises: a main housing; an inlet tube; a split insulated metal enclosure; exhaust outlet port and heat inlet port and; a discharge valve; a discharge holding tank; a pump; a diverter valve; a vent pipe; a condenser; a holding tank; a actuator valve; sensors; and a check valve;
   e) the carbon refiner at least comprises: the lower reactor screw and a gated airlock arrangement; a upper gate; an ash discharge auger; a first hopper; a level indicator; a drive; a middle gate; a lower hopper; a lower gate; a metering screw rotating in a hollow drive shaft; matching air openings; a duct; a burner blower; a combustion chamber; a pilot flame; a discharge opening; a motor drive; an packing seal; a vent line; a water bubbler; a vacuum source; a separator tank; a level switch; a vertical lift auger; an opening; openings in the lift tube; a condenser inline; a horizontal screw auger; a first airlock; a cyclone; a second airlock; a blower; an exhaust into a bag filter; and a third airlock;
   f) the safety burner tower at least comprises: an inlet valve; a pipe a safety burner housing base having a bubbler chamber; a modulating blower; a venturi nozzle; a pilot light; a bubbler chamber; having an insulated area; a computer; a stack; a battery backup; a level switch.

2. The Pyrolysis plant as claimed in claim 1, wherein the exhaust heated feeder also comprises temperature probes; pressure sensors; a set of bushing bearings; a face plate; and bras washers.

3. The Pyrolysis plant as claimed in claim 2, wherein the plant is protected with a nitrogen purge system.

4. The Pyrolysis plant as claimed in claim 1, wherein the said twin screw feeder comprises: the two screws which first flights having constant diameters, those diameters increasing in second flights and then decreasing in third flights and having a reversed flight section in said third flights; a valve; a duct; an enlarged center section of the enlarged section.

5. The Pyrolysis plant as claimed in claim 4, wherein the plant is protected with a nitrogen purge system.

6. The Pyrolysis plant as claimed in claim 1, wherein the dual gas burner supplies hot air to heat said twin screw feeder.

7. The Pyrolysis plant as claimed in claim 6, wherein the plant is protected with a nitrogen purge system.

8. The Pyrolysis plant as claimed in claim 1, wherein the plant is protected with a nitrogen purge system.

9. The Pyrolysis plant as claimed in claim 1, wherein the said twin screw feeder (102) comprises: the two screws which first flights having constant diameters, those diameters increasing in second flights and then decreasing in third flights and having a reversed flight section in said third flights; a valve; a duct; an enlarged center section of the enlarged section.

* * * * *